(12) United States Patent
Moriguchi et al.

(10) Patent No.: US 7,214,447 B2
(45) Date of Patent: *May 8, 2007

(54) GRAPHITE POWDERS SUITED FOR NEGATIVE ELECTRODE MATERIAL OF LITHIUM ION SECONDARY BATTERY

(75) Inventors: Koji Moriguchi, Hyogo (JP);
Mitsuhara Yonemura, Hyogo (JP);
Kazuhito Kamei, Hyogo (JP); Masaru Abe, Hyogo (JP); Hideya Kaminaka, Hyogo (JP); Noriyuki Negi, Hyogo (JP); Atsuo Omaru, Fukushima (JP);
Masayuki Nagamine, Fukushima (JP)

(73) Assignee: Sony Corporation, Tokyo (JP)

( * ) Notice: Subject to any disclaimer, the term of this patent is extended or adjusted under 35 U.S.C. 154(b) by 413 days.

This patent is subject to a terminal disclaimer.

(21) Appl. No.: 10/826,233

(22) Filed: Apr. 16, 2004

(65) Prior Publication Data

US 2006/0134523 A1    Jun. 22, 2006

Related U.S. Application Data

(63) Continuation of application No. 09/292,834, filed on Apr. 16, 1999, now Pat. No. 6,764,767.

(30) Foreign Application Priority Data

Apr. 21, 1998 (JP) ................. P10-111001

(51) Int. Cl.
*H01M 4/58* (2006.01)
*C01B 31/04* (2006.01)
(52) U.S. Cl. .................. 429/231.8; 423/448
(58) Field of Classification Search ............... 423/266, 423/275, 291, 439, 448; 429/231.8; 428/408
See application file for complete search history.

(56) References Cited

U.S. PATENT DOCUMENTS

| 6,156,457 | A | 12/2000 | Takami et al. ............ 429/231.4 |
| 6,235,675 | B1 * | 5/2001 | McIlroy .................. 423/291 X |
| 6,576,369 | B1 * | 6/2003 | Moriguchi et al. ....... 429/231.8 |
| 6,764,767 | B2 * | 7/2004 | Moriguchi et al. .......... 428/408 |

FOREIGN PATENT DOCUMENTS

| EP | 0 762 522 | 3/1997 |
| JP | 07-223809 | 8/1995 |
| JP | 08-031422 | 2/1996 |
| JP | 09-259886 | 10/1997 |

OTHER PUBLICATIONS

Computer-generated English translation of JP 08-31422, obtained from the Japanese Patent Office website (doc date Feb. 1996).*

* cited by examiner

*Primary Examiner*—Stephen J. Kalafut
(74) *Attorney, Agent, or Firm*—Bell, Boyd & Lloyd LLP

(57) ABSTRACT

A graphite powder suitable for a negative electrode material of a lithium ion secondary battery which assures a high discharging capacity not lower than 320 mAh/g is to be manufactured at a lower cost. Specifically, a graphite powder containing 0.01 to 5.0 wt % of boron and having a looped closure structure at an end of a graphite c-planar layer on the surface of a powder, with the density of the interstitial planar sections between neighboring closure structures being not less than 100/μm and not more than 1500/μm, and with d002 being preferably not larger than 3.3650 Å, is manufactured by (1) heat-treating a carbon material pulverized at an elevated speed before or after carbonization for graphization at temperature exceeding 1500° C. or by (2) heat-treating the carbon material pulverized before or after carbonization at a temperature exceeding 1500° C. forgraphization and subsequently further heat-treating the graphized material at a temperature exceeding a temperature of the oxidating heat treatment and the heat treatment in the inert gas.

12 Claims, 10 Drawing Sheets

GAP PLANE

GRAPHITE POWDERS SUITED FOR NEGATIVE ELECTRODE MATERIAL OF LITHIUM ION SECONDARY BATTERY

This patent application is a continuation of U.S. application Ser. No. 09/292,834, filed on Apr. 16, 1999, now U.S. Pat. No. 6,764,767, the disclosure of which is herein incorporated by reference.

BACKGROUND OF THE INVENTION

1. Field of the Invention

This invention relates to graphite powders having a novel structure suitable as a carbonaceous material for a negative terminal of a lithium ion secondary battery. More particularly, it relates to graphite powders that are able to fabricate a negative electrode of a lithium ion secondary having a high discharge capacity and superior charging/discharging efficiency, a method for producing these graphite powders, a material for a negative electrode of the lithium ion secondary battery formed of these graphite powders, and a lithium ion secondary battery having the negative electrode which is fabricated from this negative terminal material.

2. Description of Related Art

A lithium secondary battery is among non-aqueous secondary batteries employing lithium as an active material for a negative electrode, an oxide of a transition metal or chalcogenides, such as sulfides or selenides, as an active material for the positive electrode, and a solution of an inorganic or organic lithium salt in a non-protonic organic solvent, as an electrolytic solution.

Since lithium is a metal having an extremely base potential, it is possible with the battery employing this as a negative electrode to take out a large voltage easily. Consequently, a lithium secondary battery is recently stirring up notice as a secondary battery of high electromotive force and a high energy density, such that expectations are made of applications thereof as a distribution or portable type battery in a wide range of applications, such as electronic equipments, electric cars or power storage. It is already being put to use as a small-sized battery.

In an early version of the lithium secondary battery, use is made of a foil-shaped metal lithium as a negative electrode material. In this case, a charging/discharging reaction proceeds by dissolution (ionization) and precipitation of lithium. However, since metal lithium tends to be precipitated as a needle on the negative electrode in the reaction of $Li^+ \to Li$, repeated charging/discharging leads to precipitation of a dendritic lithium (lithium dendrite) on the surface of the negative electrode. If growth of this lithium dendrite is allowed to proceed, shorting with the negative electrode tends to occur through a separator (partition), thus leading to a fatal defect of an extremely short repetitive charging/discharging cyclic life.

As means for solving the problem of the lithium secondary battery, it is proposed in, for example, Japanese Laying-Open Patent S-57-208079 to use a carbon material capable of storing and yielding lithium ions, such as natural graphite, artificial graphite, petroleum coke, sintered resin, carbon fibers, pyrocarbon, carbon black etc, as a negative electrode material. In this case, the negative electrode material may substantially be formed only of the carbon material, and an electrode operating as a negative electrode usually can be fabricated by allowing powders of the carbon material to be deposited on a metal current collector along with a suitable resin binder.

Although the electrode reaction of a lithium secondary battery, the negative terminal of which is prepared from this carbonaceous material, is not known precisely, it may be presumed that, during charging, electrons are forwarded to the carbon material of the negative electrode and charged to the negative polarity such that lithium ions in the electrolytic solution are accumulated by electro-chemical intercalation in the carbon material of the negative electrode charged to the negative polarity. Conversely, during the discharging, lithium ions are desorbed (de-intercalated) from the carbon material of the negative electrode and emitted into the electrolytic solution. That is, charging/discharging occurs due to accumulation and emission of lithium ions in or from the negative electrode material. Therefore, this sort of the battery is generally termed a lithium ion secondary battery. In the lithium ion secondary battery, in which metal lithium is not precipitated during the electrode reaction, there is raised no problem of deterioration of the negative electrode due to dendritic precipitation. The lithium secondary battery now in use is mainly of this type, that is, a lithium ion secondary battery the negative electrode of which is formed of a carbon material.

The theoretical capacity of the lithium ion secondary battery, the negative electrode of which is formed only of metal lithium, is as high as approximately 3800 mAH. Conversely, the theoretical capacity of the lithium ion secondary battery, the negative electrode of which is formed of a lithium/graphite interlayer compound ($C_6Li$), is 372 mAH/g, this capacity being retained to be a limit or threshold capacity. It is noted that the lithium/graphite interlayer compound ($C_6Li$) is an inter-layer compound in which lithium ions are packed densely in a regular pattern between layers of graphite which is the most crystalline carbonaceous material.

However, since surface activated sites which inhibit intrusion of lithium ions into the carbon material of the negative electrode and a dead zone against packing of lithium ions exist in actuality in the carbon material of the negative electrode, it has been extremely difficult to achieve the threshold capacity of 372 mAH/g even with the use of the high crystalline graphite as the carbon material for the negative electrode of the lithium ion secondary battery.

Meanwhile, the carbon material may be classified into hard carbon (low-crystalline amorphous carbon) and soft carbon (high-crystalline graphite carbon). The above-mentioned threshold capacity, which holds for the soft carbon, fails to hold for the hard carbon, there being a material manifesting a higher capacity per weight. However, the capacity per volume is lowered because of the lower density of the hard carbon.

If the graphite, as the high-crystalline carbon material, is used as the negative electrode material, there is deposited an inactivated skin film in the course of charging with the above-mentioned decomposition of the electrolytic solution. Since the electrical quantity used at this time represents the loss, the charging/discharging efficiency [discharging capacity/charging capacity×100(%)], as one of battery indices, is lowered. This is a considerable demerit for a usage such as a small-sized battery having a pre-set shape standard because the quantity of the negative electrode material needs to be estimated to a larger value at the time of battery designing.

For approaching the discharging capacity of the lithium ion secondary battery to the above-mentioned threshold capacity as much as possible, various proposals have so far been made as to the manufacturing method for the carbonaceous material for the negative electrode.

For example, it is proposed in Japanese Laying-Open Patent H-4-115458, Japanese Laying-Open Patent H-5-234584 and Japanese Laying-Open Patent H-5-307958 to use carbides of mesophase globules generated in the pitch carbonization process. The mesophase globules are spherically-shaped particles exhibiting optical isomerism (properties of liquid crystal) and which are generated on heat treatment of pitches for several hours at approximately 400 to 550° C. On continued heat treatment, the globules grow in size and coalesce to become a bulk mesophase which exhibits optical isomerism in their entirety. This bulk mesophase can also be used as the carbon material. However, the discharging capacity of the lithium ion secondary battery employing this negative electrode material is as yet rather low.

In the Japanese Laying-Open Patent H-7-282812, attempts are made to raise the regularity of the layered disposition of the graphite layers in association with graphized carbon fibers to raise the capacity of the lithium ion secondary battery. In this publication, it is stated that, on pulverizing the carbon fibers, undesirable structural defects different from the regular layer disposition of the graphite layers of the original carbon fibers are introduced, such that, for raising the capacity of the lithium ion secondary battery, it is meritorious to raise the regularity of the layered disposition of the graphite layers. However, if the regularity of the layered disposition of the graphite layers is raised in this manner, the discharging capacity of the lithium ion secondary battery is 316 mAH/g at the maximum, such that it is not possible to obtain a negative electrode material of the graphite-based carbonaceous material having the capacity as high as 320 mAH/g or higher.

In Japanese Laying-Open Patent H-6-187972, there is disclosed a carbon material obtained on firing, at an elevated temperature, a resin obtained in turn by reacting aromatic components with a cross-liking agent in the presence of an acid catalyst. This carbon material has a structure in which a crystal area of crystallized aromatic components and an amorphous area of amorphized cross-linking agents co-exist and, due to the differential thermal expansion/contraction coefficients between the two, numerous internal structural defects are manifested. It is stated that not only lithium ions are introduced into an inter-layer area to form $C_6Li$, but also metal lithium is occluded int these structural defects, as a result of which it is possible to constitute high-capacity lithium ion secondary battery. However, since a special resin is used as a starting material, the cost of the material is high, thus producing economic demerits. Moreover, since the carbonaceous material is the hard carbon, the capacity per unit volume is lowered. In addition, with this material, the charging/discharging efficiency cannot be improved.

In the Japanese Laying-Open Patent H-3-245548, there is disclosed a carbonaceous material obtained on carbonizing an organic material. This material uses a costly organic resin material, in particular the phenolic resin, as the carbonaceous material, thus raising the cost for the material.

This carbonaceous material is stated as exhibiting a high discharging capacity per unit weight exceeding the threshold capacity of 372 mAH/g for graphite. However, since this material also is hard carbon, the true density is lower, specifically of the order of 1.55 g/cc. On the other hand, the true density of graphite is as high as approximately 2.2 g/cc. Therefore, the discharging capacity per unit volume of the above-mentioned carbonaceous material is as low as 380 mAh/g×1.55 g/cc=589 mAh/cc, in comparison with the discharging capacity per unit volume of the graphite-based material, even though the latter has a lower discharging capacity of, for example, 320 mAH/g. As a consequence, the hard carbon material suffers from the problem that the battery cannot be reduced in size, such that the graphite-based material is more favorable for reducing the battery size because of its high true density.

The present invention envisages to provide a graphite-based material of high true density which is suited for a negative electrode material of a small-sized high-capacity lithium ion secondary battery, even though a carbon material similar to a conventional carbon material is used in place of special resins for carbonization, and a manufacturing method thereof.

The present inventors have proposed a high-performance negative electrode material in which the carbon network layer (graphite c-planar layer) has a looped closed structure on the powder surface and in which the density of the interstitial planar sections between the looped closed structures along the graphite c-direction may be controlled to realize a charging/discharging capacity exceeding 320 mAH/g. However, as will now be explained, this negative electrode material is in need of a high-temperature heat treatment at a temperature exceeding 2500° C. for graphization, as before, while a still higher temperature exceeding 3000° C. is required for realizing a higher capacity, such that further improvement is required for application to industrial mass production.

FIG. 1 shows the relation between the discharging capacity and d002 (FIG. 1a) and that between d002 and the graphization temperature (FIG. 1b) in case the bulk mesophase obtained from the petroleum pitch is pulverized, carbonized and subsequently graphized by changing the temperature. It is noted that d002 is the distance between c-axis planar lattices (interlayer distances).

It is seen that d002 is decreased with rise in the graphization temperature and that, with decrease in d002, the discharging capacity is increased. This relation between the discharging capacity and d002 is reported in, for example, Iizima et al, Synth. Met., 73 (1995), 9, from which it is seen that approaching d002 to close to that of natural graphite to raise the capacity is a commonplace technique in the graphite-based negative electrode material (d002 of ideal natural graphite=3.354 Å).

However, in order to obtain a graphite material with d002=3.360 Å, the graphizing heat treatment at an elevated temperature of the order of 3000° C. is required, as may be seen from FIG. 1b. Thus, the graphite-based negative electrode material with a smaller value of d002, that is with a higher performance, cannot be obtained if only the measures of elevating the temperature of the graphizing heat treatment is resorted to.

Meanwhile, from the disturbed carbon network (condensed poly-cyclic structure of six members of carbon), the microscopic process of graphization may be envisioned as being a process of ordering of the arrangement of carbon atoms to a layered graphite phase.

FIG. 2 shows an example of a disturbed network of carbon clusters obtained by a molecular dynamic method employing the Tersoff potential [J. Tersoff, Phys. Rev. Lett., 19, 2879 (1988)]. The system of FIG. 2 is a network with a potential approximately 1.3 eV higher per atom than the structural energy of graphite. In FIG. 2, an arrow indicates a $sp^3$ (four ligancy) carbon atoms different from $sp^2$ (three ligancy) carbon in the graphite. In the disturbed carbon network, the presence of carbon atoms with different numbers of ligands may be easily estimated from the following considerations.

FIG. 3 shows the relation between the pressure and the Gibbs free energy (enthalpy) at 0K of diamond and graphite as calculated using the Tersoff potential. It is noted that diamond and graphite represent typical examples of the $sp^3$ (four ligancy) network and $sp^2$ (three ligancy) network, respectively. As may be seen from FIG. 3, the four ligancy carbon network and the three ligancy carbon network are stable at high pressure and at low pressure, respectively, with the two being approximately equal to each other in energy and stabilized at a zero pressure.

A wide variety of carbon materials are produced industrially, and a wide variety of structures of the carbon materials have been found. The reason is that, with the structure of the carbon material, a wide variety of combinations of the two networks of substantially equally stable $sp^3$ (four ligancy) and $sp^2$ (three ligancy) are possible. It may be estimated from FIG. 3 that four ligancy network and the three ligancy network are generated in the portion of a run-of-the-mill carbon material subjected to compressive distortion and to that subjected to the tensile distortion, respectively.

The process of graphization is the process of solid-phase growth from the disturbed carbon network, shown in FIG. 2, to the laminar planar carbon structure (three ligancy network). This process is felt to be accompanied by extinguishment of the four ligancy carbon and ordering to a three ligancy network. For example, for changing from the disturbed carbon network as shown in FIG. 2 to the planar three ligancy network, two elementary processes, namely (1) cutting of the bond of the four ligancy carbon and (2) correcting the bond angle and the bond length to $sp^2$ (three ligancy) system. This may be presumed to be accompanied by a significant activation energy.

The process of graphization is now explained a little more theoretically. An experimental value of d002 in natural graphite is 3.3545 Å, with d002 of synthetic graphite gradually approaching that of natural graphite by raising the graphization temperature (see FIG. 1b). Since graphite represents the most stable state, as does diamond, insofar as the element carbon is concerned, it may be presumed that, in the carbon material, there exists a structural energy function for a status parameter (<d002) as shown in FIG. 4 in the carbon material. If such relation between d002 and the structural energy is presupposed, the behavior of d002 and the graphization temperature as shown in FIG. 1b can be explained qualitatively as follows: That is, the higher the temperature, the higher becomes the possibility of the energy barrier ΔE (see FIG. 4) being surpassed thus enabling transition to crystallinity close to natural graphite.

On the other hand, the existence of hard carbon, representing the negative electrode material for the lithium ion secondary battery hand-in-hand with the graphite-based carbon material, may be presumed as follows: That is, in certain carbon network, the energy barrier ΔE cannot be surpassed at a temperature corresponding to the graphization temperature, thus resulting in a minimum energy value remote from that of the natural graphite. This energy barrier ΔE is the activation energy accompanying the growth of the of the planar three ligancy network for the graphite from the above-mentioned disturbed network, specifically the energy barrier required for bond re-arrangement and re-coordination. Specifically, this model indicates that re-coordination of the carbon network represents the speed-regulating stage of graphization (graphite solid phase growth).

In the elementary process of graphization, it is necessary to cut the linkage of the four ligancy carbon. This may be presumed to be accompanied by a, extremely large activation energy. Thus, the present inventors directed attention to the III group elements that can form three a bonds. The reason is that, if the amount of the four ligancy element carbon of the disturbed carbon network can be reduced by substitution by three ligancy elements, the activation energy is diminished, so that, from the above considerations, there is a possibility of the graphization temperature being changed significantly by small changes in the activation energy. There is, however, a problem raised as to whether or not, in the graphite network following graphization, the III group element can substitute the carbon element without disturbing the planar structure.

If, in the lithium ion secondary battery, the graphite-based carbon material is used as the negative electrode material in the lithium ion secondary battery, the charging/discharging reaction takes place by intercalation of lithium ions to the negative electrode material. If three ligancy elements are substituted such as to disturb the planar structure, the risk is high that lithium ion intercalation is obstructed. Thus, the present inventors have searched, by the molecular orbit method, into stability of the three ligancy elements in the graphite network, and have ascertained by the computational chemical technique that boron can be substituted for carbon without disturbing the graphite planar section, as shown in FIG. 5.

Thus, the present inventors have surmised that, if boron that can be substituted for carbon without disturbing the graphite planar section is added and graphization heat treatment is carried out, this element would act as a sort of a catalyst to render it possible to produce graphite with small d002 at a lower energy (that is at a lower heat-treatment temperature) than conventionally. This point was confirmed by an experiment.

FIG. 6 shows an example of the relation between the inter-layer distance d002 and the graphization temperature of graphite samples obtained on heat-treatment at various graphization temperatures of an as-carbonized carbonaceous material admixed with boron and the same material not admixed with boron. With the material admixed with boron, a small value of d002 can be realized with a graphization heat treatment at a lower temperature, with the rate of change of d002 with respect to the graphization temperature being lower than that with the material not admixed with boron. That is, it has been found that, with the material admixed with boron, it is possible to produce a negative electrode material with a lower value of d002 and hence of a larger capacity than that produced with the conventional high temperature heat-treated material.

The present inventors have confirmed that if, in the previously proposed graphite-based negative electrode material having a looped closure structure of the carbon network layer on the surface, the carbon material is subjected to graphizing heat treatment after addition of B, a negative electrode material with a higher performance can be produced inexpensively at a lower graphization temperature, and a negative electrode material of a higher performance can be produced at a comparable graphization temperature. This finding has led to completion of the present invention.

In the Japanese Laying-Open Patent H-3-245458, there has been disclosed a high capacity carbonaceous material containing 0.1 to 2.0 wt % of boron. However, this publication fails to disclose the effect of addition of boron on d002 or on heat treatment temperature. The present invention is reached only by simultaneously employing two elements, that is control of the interstitial planar section density in the graphite having the looped closure structure as found previously by the present inventors, and addition of boron. A principal object of addition of boron in the present invention is to lower the temperature in the graphizing heat treatment, with the object of boron addition being slightly different from the object in the above-mentioned Publication. It is noted that the graphite material with a smaller d002 value can be obtained by heat treatment at a temperature lower than that used conventionally.

BRIEF DESCRIPTION OF THE DRAWINGS

FIGS. 8a to 8c are schematic views showing the results of generation of looped closed structure at the terminal end of a carbon network layer of the graphite by computer simulation, wherein FIG. 8a shows an interstitial planar section of a looped closed structure, FIG. 8b is a perspective view of a looped closed structure devoid of a defect and FIG. 8c is an end view of a looped closed structure.

SUMMARY OF THE INVENTION

The present invention has been completed on the basis of the above information and resides in (1) to (4) below:
(1) graphite powder containing 0.01 to 5.0 wt % of boron and having a looped closure structure at an end of a graphite c-plane layer on the surface of a powder, with the density of the interstitial planar sections between neighboring closure structures being not less than 100/μm and not more than 1500/μm.
(2) A method for producing a graphite powder as defined above including a boron addition step, wherein a carbon material pulverized at an elevated speed before and/or after carbonization is heat-treated at a temperature exceeding 1500° C. for graphization.
(3) A method for producing a graphite powder as defined above including a boron addition step wherein a carbon material pulverized before and/or after carbonization is heat-treated at a temperature exceeding 1500° C. for graphization, the heat-treated carbon material is surface-processed under a condition of scraping the surface of the produced graphite powder, and wherein the surface-processed carbon material is heat-treated in an inert gas at a temperature exceeding 800° C.
(4) A negative electrode material for a lithium ion secondary battery mainly composed of the above-defined graphite powders and a lithium ion secondary battery including a negative electrode manufactured from this negative electrode material.

According to the present invention, graphite powders having the looped closed structures with a high density of the interstitial planar sections constituting LI ion intrusion sites can be manufactured from a run-of-the-mill carbonaceous material without the necessity of using special expensive resin material. Moreover, since graphization proceeds even at a lower heat treatment temperature, due to a catalytic action of boron added before the graphization heat treatment, it is possible to manufacture graphite powders of high crystallinity with d002 not higher than 3.3650 Å which is close to the ideal value of d002 of 3.354 Å at a reduced cost.

By employing the graphite powders of high crystallinity and high density of the interstitial planar sections of the looped closed structures, according to the present invention, as a negative electrode material of a lithium ion secondary battery, it is possible to realize a high discharging capacity occasionally exceeding 350 mAh/g. The battery employing these graphite powders serves as a lithium ion secondary battery of a high capacity. Therefore, it is possible with the present invention to lower the manufacturing cost and improve the performance of a lithium ion secondary battery.

Figure 7:
FIG. 7 is a typical example of photograph taken with a high resolution electronic microscope showing a looped closed structure of a graphite powder obtained by a first method, with an arrow indicating an interstitial plane.
Figure 8C:
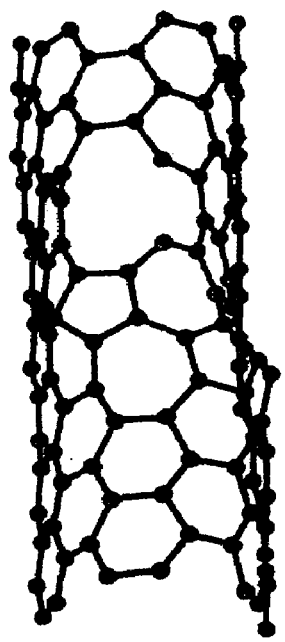
Figure 8B:
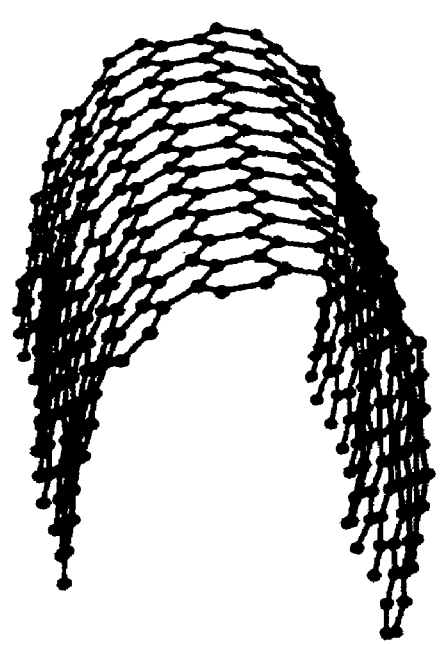
Figure 9:
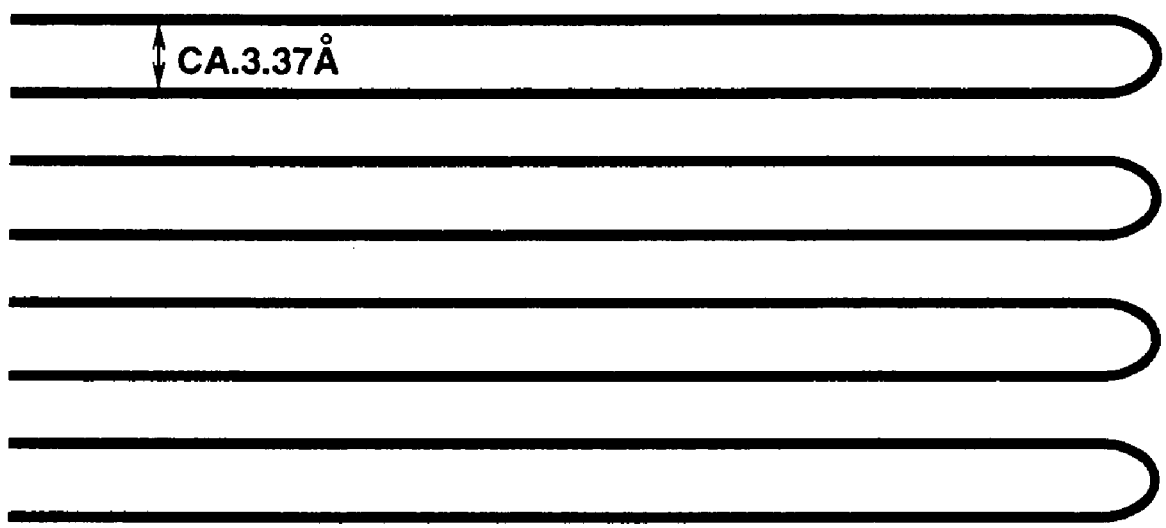
FIG. 9 is a schematic view showing a surface structure in case the looped closed structures of the graphite are of the maximum density of the interstitial planar sections.

In the present invention, the "loop-like closure" or the "looped closed structure" in the present invention means a structure in which terminal ends of the carbon network layer (graphite c-planar layer) are coupled to each other to form a loop and hence a closed structure. This loop may be a single-layer loop as shown in FIG. 8b or 9, or a multi-layered loop as shown in FIGS. 7 and 11.

Figure 8A:
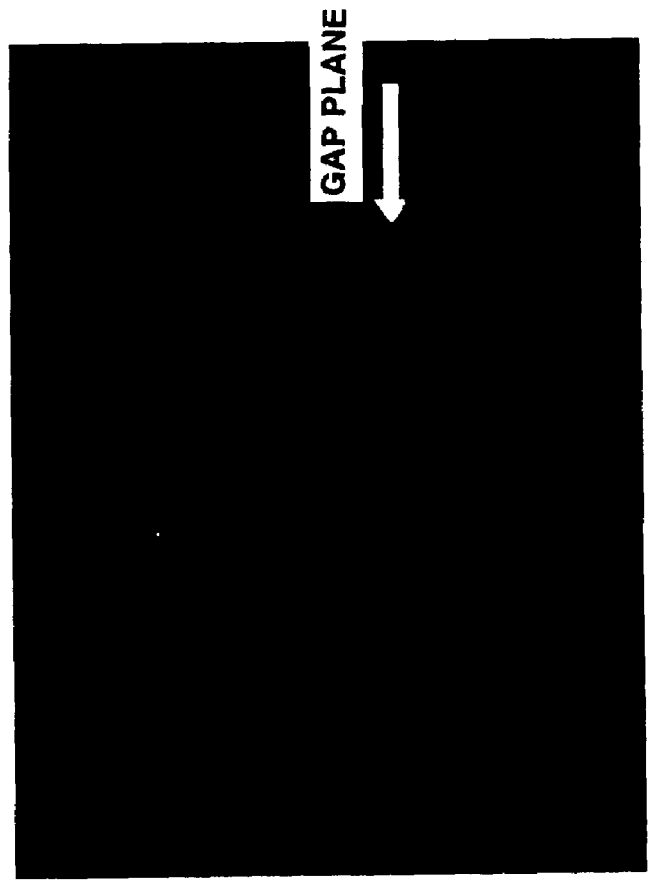
Figure 11:
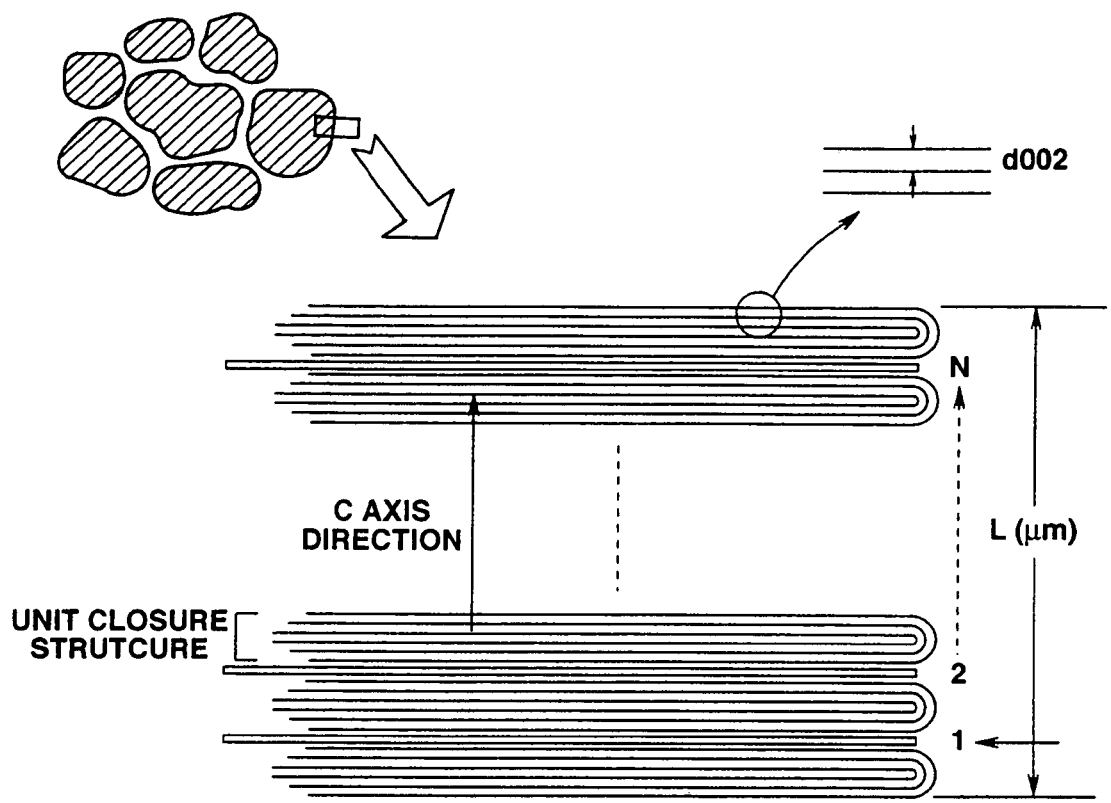
FIG. 11 is a schematic view showing layered looped closed structures at the terminal ends of the c-planar layers (carbon network layers) appearing on the surface of the graphite powder according to the present invention.

The "interstitial plane" means a planar section between outwardly opened graphite layers between two neighboring looped closed structures, as shown in FIGS. 8a and 11. If the two looped closed structures are both of the layered looped type, only the interstitial planar section between the outermost layers of these two neighboring layered loops is opened towards outside, so that this interstitial planar section represents the interstitial planar section in the meaning of the present invention, whilst the a gap or an interstice between two neighboring carbon network layers in the sole layered loop is closed with a loop and hence is not the interstitial planar section in the meaning of the present invention.

The "density of the interstitial planar sections" is defined as the number of interstitial planar sections per μm in a direction perpendicular to the graphite c-plane (the planar section of the carbon network layer ), that is the c-axis direction as shown in FIG. 11. If the closed structure is a of a layered loop type, this density of the interstitial planar sections is substantially the same as the density of the looped closed structures in case a looped layered element is counted as one, that is the number of the looped closed structures per µm in the c-axis direction.

In general, graphite powders are constituted by a large number of regions having different c-axis directions, equivalent to crystal grains of the polycrystalline powders, each region, more particularly, a region forming a lump along the c-axis direction, being termed a crystallite. With the graphite powders of the present invention, it is unnecessary for the entirety of the ends of the c-planar layers on the powder surfaces of the totality of the crystallites constituting the powers to present the above-mentioned looped closed structures. However, it is naturally preferred that substantially the totality of the crystallites possess these looped closed structures. The reason is that the looped closed structures are completely continuous and chemically stable to render intrusion of the electrolytic solution to improve the charging/discharging characteristics.

Moreover, with the present invention, the density of the interstitial planar sections of the looped closed structures is high, that is, the number of times of layering of a layered looped closed structure is small so that the radius of curvature of the loops of the looped closed structures is rather small. Li ions are intruded via interstitial planar sections or void type defects (see FIG. 8) into the graphite and stored therein. The loops are the sites where defects of the carbon network layer tend to be produced, this tendency being especially high in the looped closed structures having a small radius of curvature. With the graphite powders of the present invention, since there exist numerous interstitial planar sections and void type defects, representing intrusion sites of the Li ions, the quantity of intrusion and hence storage of the Li ions in the graphite is increased. This possibly accounts for the increase in the discharging capacity.

EXAMPLE OF THE INVENTION

The graphite powders of the present invention, enabling the graphizing heat treatment temperature to be lowered, contain 0.01 to 5.0 wt % of boron. The boron content is preferably 0.02 to 3.0 wt % and more preferably 0.02 to 1.5 wt %.

If the boron content is less than 0.01 wt %, the boron content can exhibit no substantial function as a catalyst for lowering the temperature of graphizing heat treatment. If isolated and scattered like atoms in the pre-graphization carbon material, the boron content exhibits the maximum catalytic action. If the boron content is in an amount exceeding 5.0 wt %, since boron in a state of solid solution in graphite has a concentration not higher than 3.0 wt % (see G. E. Lowell, J. Am. Ceramic. 50. (I966) 142), any remaining boron is precipitated as carbides, such as $B_4C$, thus undesirably decreasing the apparent charging/discharging capacity.

Since the principal role of the boron content in the present invention is to lower the temperature of the graphizing heat treatment, it suffices if boron is isolated and distributed like atoms in the pre-graphization carbon material, with the time point of boron addition being irrelevant. That is, boron addition may occur after carbonization or at the time of preparation of the carbonaceous material used for the graphizing heat treatment. Of importance is that the carbon material used for the graphizing heat treatment contain boron preferably in an atom-like isolated and distributed state, whereby the catalytic action for graphization is accelerated. Therefore, as far as application to industry is concerned, it suffices if the addition time point is selected to match the boron addition timing to the pre-existing process. For example, if carbonization and graphization are executed in succession, it is necessary to add boron prior to carbonization. If a boron compound is added, it is preferably added before carbonization at the latest in view of homogenization. If the carbon material is in the form of mesophase globules or bulk mesophase, boron is preferably added during the pitch carbonization process, inasmuch as the boron compound in this case is decomposed during the carbonization to facilitate the formation of a material in which boron is isolated and distributed like atoms in the carbon.

There is no particular limitation to the type of the boron compounds used for boron addition if these compounds are able to distribute boron in isolation like atoms. Examples of the boron compounds include boron carbide, such as BC, $B_4C$, $B_6C$, boron oxides, such as $B_2O_2$, $B_2O_3$, $B_4O_3$ or $B_4O_5$, boron oxo acids, such as orthoboric acid, metaboric acid, tetraboric acid and hypoboric acid, and salts thereof. The types of boric compounds may be suitably selected depending on the time point of addition.

The graphite powders according to the present invention possess micro-structural characteristics, in addition to boric acid addition, namely that the surface of the graphite powders has a looped closed structure of the carbon network layer and that the density of the interstitial planar sections between the looped closed structures along the graphite c-axis direction is not less than 100/µm and not larger than 1500/µm. The looped closed structures and the interstitial planar sections of the graphite powders can be observed by a photograph, taken by a high-resolution electronic microscope, showing the cross-section in the vicinity of the graphite powders. The density of the interstitial planar sections can be found from this microscope photograph.

If the density of the interstitial planar sections is less than 100/µm, the site of intrusion of Li ions is small, even though the graphite powders possess the looped closed structure, to render it difficult to realize a high discharging capacity exceeding 320 mAh/g. The upper limit of 1500/µm of the interstitial planar section density corresponds to the interstitial planar section density of the single-layer looped closed structure shown schematically in FIG. 9, or to the maximum interstitial planar section density theoretically predicted from the graphite crystal structure.

In a preferred embodiment of the graphite powders of the present invention, (1) the c-axis (002) planar section lattice distance (d002) as found by the high-precision lattice constant measurement method by X-ray diffraction is not more than 3.3650 Å;

(2) the specific surface area is not larger than 1.0 m$^2$/g;

(3) the graphite crystallite has a diameter of 100 to 2000 Å and/or (4) the volume cumulative mean particle size, as found by the laser diffraction diffusion method, is 5 to 35 µm.

The reason for above numerical limitation is as follows: If, when the above-mentioned closed structure is used, there exist carbon atoms exhibiting relatively high reactivity by not having the closed structure, it is likely that the reaction with an electrolytic liquid occurs to lower the charging/discharging efficiency. For further improving the charging/discharging efficiency, it is desirable to reduce the specific surface area of the graphite powders to further decrease the reactivity with the electrolytic solution. Therefore, the specific surface area of the graphite powders according to the present invention is preferably not higher than 1.0 m²/g. The specific surface area can be found by the BET measurement method by N² substitution.

If the specific surface area of the graphite powders is larger than 1.0 m²/g, there are occasions wherein reactivity of graphite powders with respect to the electrolytic solution is increased to lower the charging/discharging efficiency or the cyclic durability. Although there is no particular limitation to the lower limit of the specific surface area, it is usually not lower than 0.5 m²/g. More preferably, the specific surface area is 0.2 to 0.8 m²/g. The specific surface area is varied mainly depending on pulverization conditions, in particular on the pulverization time duration.

The graphite c-axis direction is the direction perpendicular to the c-planar direction. The c-axis (002) plane lattice distance (d002) is the distance between neighboring c-planar layers, namely the inter-layer distance. This inter-layer distance d002 is an index of crystallinity, such that, if this value becomes smaller to approach to a value of an ideal graphite (=3.354 Å), the crystallinity of the graphite powders becomes higher. The crystallinity of the graphite powders depends on the graphizing heat treatment, such that the higher the heat treatment temperature, or the longer the time, the higher is the crystallinity of the produced graphite powders.

In general, the lattice distance of the crystal can be determined from the diffraction peak of the X-ray diffraction diagram. Heretofore, this lattice distance is determined using "Method for Measuring the Size of Crystallites and Lattice Constant of Artificial Graphite", as prescribed by the 117th Committee of Japan Society of Promotion of Science. However, the lattice distance measured by this method is corrupted with a significantly large error such that there is a risk that the physical properties of a material cannot be measured accurately. Thus, the present invention uses a precise value of d002 as found by the precise measurement method for the lattice constant exploiting the least square method including the diffractometer error. If the value of d002, thus found, is larger than 3.3650 Å, the graphite powders are as yet not of sufficient crystallinity, such that a high discharging capacity occasionally cannot be realized. The value of d002 is preferably not larger than 3.3600 Å.

The diameter of the graphite crystallite is the length along the c-axis direction of the graphite crystallite (area in the powder having the same c-axis direction) as mentioned previously. If the crystallite diameter is lower than 100 Å, there are occasions wherein the crystallite becomes so small that the crystals are disturbed significantly such that lithium ions intruded from the interstitial planar section cannot be stored efficiently. On the other hand, the crystallite diameter exceeding 2000 Å can be realized only on prolonged graphizing heat treatment which is not economically meritorious. The crystallite diameter preferably is in a range from 500 to 1500 Å.

In the present invention, the mean particle size of the graphite powders is expressed by a volume cumulative 50% value as found by the laser difraction scattering method. If this mean particle size is less than 5 μm, the powder size occasionally is too small so that the specific surface area is increased to lower the charging/discharging efficiency as mentioned previously. If the mean particle size is larger than 35 μm, the packing density is lowered, and diffusion of lithium ions stored in the inside of the powders takes prolonged time, thus occasionally lowering discharge characteristics for large current discharge or low temperature discharge. The preferred mean particle size is 10 to 30 μm.

Preferably, particles larger in size than 75 μm, affecting discharging characteristics for large current discharge or low temperature discharge, or small-sized particles smaller than 1 μm, deteriorating the initial charging/discharging properties, should be substantially absent. Moreover, there is a risk that, when graphite powders admixed with large-sized particles, are coated on a strip-shaped pole plate, and the resulting assembly then is wound about itself a number of times to form a spirally wound electrode member, which subsequently is sealed into a battery can, the positive and negative terminals pierce through a thin-sheet-like separator approximately 20 μm thick, due to stress concentration in the large diameter particle portion, thus causing shorting of the positive and negative terminals. This problem tends to be raised in particles of a non-definite shape having markedly different lengths of the long and short axes. These particles of indefinite shape are difficult to remove on sieving. If the mean particle size exceeds 35 μm, the possibility for the presence of the particles of a non-definite shape becomes higher.

The boron-containing graphite powders of the present invention, having the looped closed structures of the carbon network layer, can be manufactured by heat-treating and graphizing powders of the boron-containing carbon material at a temperature exceeding 1500° C. With this graphization, the graphite powders satisfying the condition of the present invention, namely the density of the interstitial planar sections of the looped closed structures of not less than 100/μm, can be produced, if the pulverization is executed under elevated speed conditions. This manufacturing method is termed the first manufacturing method. However, with this first method, the interstitial planar section density of the graphite obtained is only slightly larger than 100 μm, such as 100 to 120/μm, such that an extremely high interstitial planar section density exceeding 200/μm, can in general not be realized.

With another manufacturing method (second method), boron-containing graphite powders, obtained on graphization, are heat-treated under a condition capable of scraping the powder surface, such as under a temperature of 600 to 800° C., and subsequently heat-treated at a temperature of from 600 to 800° C. With this method, an extremely high interstitial planar section density of, for example, 500 to 1500 per μm, can be achieved.

The manufacturing method of the boron-containing graphite powders according to the present invention is not limited to the above-described first and second methods. The boron-containing graphite powders may be produced by any suitable method if ultimately the boron-containing graphite powders having the boron content of 0.01 to 5.0 wt % and the looped closed structures having the interstitial planar section density not less than 100/μm can be formed.

There is no particular limitation to the carbonaceous material used for carbonization and may be similar to that used conventionally for the manufacture of graphite. Examples of the carbonaceous material include coal tar pitch or petroleum pitch, mesophase globules generated on heat treatment thereof, bulk mesophase, which is the matrix of these globule, and organic resins or materials, such as polyacrylonitrile, rayon or resins disclosed in Japanese Laying-Open Patent H-2-282812, carbonized on heating. Most desirable carbonaceous materials are mesophase globules and the bulk mesophase.

The carbonaceous material is pulverized and carbonized to yield a carbon material. Although pulverization maybe performed before and/or after carbonization, if the carbonaceous material is pulverized after carbonization, the carbon material obtained on carbonization needs to be transiently cooled, such that it is necessary to effect heating from near the ambient temperature at the time of subsequent high temperature heat treatment for graphization, thus increasing thermal loss. Therefore, pulverization is preferably carried out before carbonization in view of thermal loss. Moreover, in this case, heat treatment for carbonization and graphization can desirably be carried out in succession.

Since the above-mentioned closure structure is formed during the graphizing heat treatment due to irregularities in the atomic level of the powder surface produced on pulverization (layer defects), it is indispensable to carry out the pulverization prior to graphization in the first method in order to obtain graphite powders having the high-density closed structures. This pulverization condition significantly influences the interstitial planar section density of the closed structures of the graphite powders generated on graphizing heat treatment.

If the graphizing heat treatment precedes the pulverization, not only is the layer defect produced in the graphite c-plane layer of graphite generated on heat treatment, but also the introduced closure structure likely to be destroyed due to pulverization. Therefore, with the first method, pulverization is desirably carried out so that the ultimate grain size (preferably of a range of 5 to 35 μm as described above) required for the targeted usage of the graphite powders will be realized prior to graphization. However, moderate pulverization aimed at disintegration or classification aimed at removal of fine particles or adjustment of mean particle size can be executed after graphizing heat treatment or, in the second method, after the last heat treatment.

In general, gas evolution from the carbonaceous material, such as mesophase, or fusion by oily contents, occur during carbonization heat treatment, thus significantly decreasing the specific surface area. During graphizing heat treatment, the specific surface area is slightly decreased due to fusion and recombination. If the specific surface area is to be not larger than 1.0 m$^2$/g in accordance with a preferred embodiment of the present invention, pulverization may be carried out taking into account these changes in the specific surface area. As an example, if the mesophase is pulverized before carbonization, it is sufficient if pulverization is carried out until the mesophase specific surface area is of the order of 5 m$^2$/g or less. If the carbon material is pulverized after carbonization, it suffices if pulverization is carried out so that the specific surface area of the mesophase will be on the order of 1.1 to 1.2 m$^2$/g. This, however, is merely illustrative since it suffices if pulverization conditions are empirically set so that the specific surface area of graphite powders obtained after graphizing heat treatment will be not larger than 1.0 m$^2$/g.

It is noted that pulverization can be carried out using a conventional crusher such as q hammer mill, a fine mill, an attrition mill or a ball mill. Of these, a crusher based on impact pulverization, for example, a hammer mill or a certain type of a ball mill, is preferred. Especially, with the above-mentioned first method, the effect of the pulverization conditions on the crystalline structure of graphite powders is significant such that high-speed pulverization needs to be used to obtain graphite powders having the interstitial planar section density of not less than 100/μm. In addition, in order to realize atomic level irregularities (layer defects) uniformly on the powder surface, pulverization time exceeding a certain time duration is required. Since specified pulverization conditions, such as rpm or the pulverization time duration, differ with the type of the crushers used or with the types of the carbonaceous material, it is sufficient if these pulverization conditions are empirically set so that graphite powders with the interstitial planar section density of 100 per μm or more will be produced after graphizing heat treatment and so that the powders of the desired grain size will be obtained. The pulverization conditions of producing graphite powders with the interstitial planar section density exceeding 100/μm or more after graphizing heat treatment solely by graphizing heat treatment are herein termed high-speed pulverization.

If, with pulverization by a hammer mill or an attrition mill, pulverization for longer than a pre-set time duration is carried out at an rpm of 5000 rpm or more, it is possible to obtain graphite powders having a closed structure with an interstitial planar section density not smaller than 100 μm following the graphizing heat treatment. If the rpm is smaller than this, the interstitial planar section density of 100 per μm occasionally cannot be realized. The rpm can be increased up to approximately 15000 rpm. However, if the rpm is increased excessively, the specific surface area of the graphite powders obtained after graphizing heat treatment is increased excessively, such that an inactivated film tends to be produced at the time of initial charging of the lithium ion secondary battery and hence a negative electrode of a high efficiency occasionally cannot be produced. The pulverization time duration is adjusted depending on the rpm. For example, in order to produce powders of a smaller specific surface area, the rpm is reduce to a smaller value, with a shorter pulverization time duration being preferred. That is, although a certain length of the pulverization time is required for increasing the interstitial planar section density, prolonged pulverization time increases the specific surface area excessively. In the case of a hammer mill, the preferred pulverization condition is 15 to 30 minutes at 5000 to 7500 rpm. This, however, is merely illustrative, such that, if the type of the crusher or the starting material is changed, the optimum rpm or the optimum pulverization time duration is also changed.

This high-speed pulverization may be carried out in the second method, whereby it is possible to obtain closed structure of graphite powders of extremely high density exceeding e.g., 500 per μm. However, since the interstitial planar section density is significantly increased by two heat treatment operations following the graphizing heat treatment, pulverization by the second method need not be high-speed pulverization, such that the rpm of 4000 to 5000 may be used. For example, a sheering crusher, such as a disc crusher, may be used to effect pulverization with a low rpm of tens to hundreds. Because of the wide degree of freedom in the crusher or in the pulverization speed, the pulverization conditions can be controlled more easily so that the specific surface area will be not larger than 1.0 m$^2$/g.

As another pulverization method, the hammer mill and the disc crusher may be used in combination in the pulverization by the first method or only the disc crusher may be used in combination in the pulverization by the second method. The rpm of the hammer mill in the first method is the high-speed rotation, that is not less than 5000 rpm, as mentioned previously. Since the pulverization by the disc crusher is mainly by cleavage by sheering, it is preferably carried out after carbonization heat treatment to aid in the pulverization. The pulverization by the disc crusher has a merit that the crystallite diameter is easier to control and in particular the crystallite diameter is larger such that powders of a relatively uniform particle size can be produced.

With this method, it is possible to produce graphite powders having a low-pitch closed structure, with the interstitial planar section density exceeding 1000/μm, even with the first method of using the hammer mill and the disc crusher in combination for pulverizing the carbon material and effecting graphization heat treatment on the pulverized carbon material to produce graphite powders.

The carbonization conditions for the pulverized carbonaceous material may be selected so that elements other than carbon contained in the starting material on decomposition of the starting material (other than carbon and boron if boron is contained from the outset in the starting material) will be removed substantially completely. For avoiding oxidation (combustion) of carbon, this carbonization heat treatment is carried out in an inactivated atmosphere or in vacuum. The carbonization heat treatment temperature is usually 800 to 1500° C. and preferably approximately 1000° C. The heat treatment time necessary for carbonization is 30 minutes to 3 hours for the temperature of 1000° C., depending on the sort of the starting material or the heat treatment temperature.

The powdered carbon material, obtained on pulverization and carbonization, is heated for graphization. Boron is previously added to the powdered carbon material or is added at this stage. By the catalytic action of boron, the temperature at which occurs the graphization (crystallization) is lowered, so that the heat treatment temperature can be lower than if the carbon material is not admixed with boron, and the temperature not lower than 1500° C. suffices. The upper limit temperature under the current heating technique is of the order of 3200° C. However, graphite powders with d002 markedly lower, and hence with the performance higher than in the case of the 3200° heat-treated material not admixed with boron, can be obtained with the heat treatment temperature of the order of 2800° C. Thus, the usual heat treatment temperature in a range of 1500 to 2800° C. suffices.

Although heat treatment is carried out until completion of heat treatment, it can be completed in a shorter heat treatment time than with the carbon material not admixed with boron for the same graphization temperature. The reason is that the reaction of graphization proceeds speedily by the graphization catalyzing action proper to boron. The graphization heat treatment time necessary for sufficient graphization, which conventionally is 30 minutes to 10 hours, is reduced in accordance with the present invention to 15 minutes to 5 hours, usually to one hour or less, due to the presence of boron, depending on the temperature or the processing quantity. The heat treatment atmosphere in this case is a non-oxidizing atmosphere, preferably a non-active gas atmosphere or vacuum.

The boron-containing graphite powders, generated by this graphization heat treatment, usually has, on the powder surface, a closed structure in which the c-planar layer terminal portions are closed in a loop. If the pre-heat-treatment pulverization is effected under a sufficiently high speed condition, graphite powders having the interstitial planar section density slightly exceeding the interstitial planar section density of 100 per μm can be produced. It is noted that, if pulverization is effected using the hammer mill and the disc crusher in combination, the interstitial planar section density becomes significantly higher. The resulting graphite powders are the graphite powders produced by the first method. Thus, if the interstitial planar section density is of the order of 100 per μm, the discharging capacity can be significantly improved than if the density is lower than 100 per μm. It has also been found that, by adding boron, it is possible to produce graphite powders affording a discharging capacity higher than with a 3200° C. heat-treated material not admixed with boron by heat treatment at a temperature of the order of 2500° C.

With the second method, the boron-containing graphite powders from the above-described graphizing heat treatment, or graphite powders obtained on pulverizing natural graphite, are occasionally admixed with a boron source and mixed together. The resulting mixture is heat-treated twice further by oxidizing heat treatment or heat treatment for scraping off other surfaces, and by heat treatment under an inert gas atmosphere, to raise the interstitial planar section density of the looped closed structures significantly. The heat treatment after the graphization in this second method is now explained.

Figure 10:
FIG. 10 shows a typical photograph, taken with a high resolution electronic microscope, for showing the cross-section in the vicinity of the graphite powders having an opened surface structure, and which are obtained on oxidating heat treatment following graphizing heat treatment.

The oxidizing heat treatment, effected initially on the graphite powders, is carried out for scraping off the surface of the powdered carbon network layer by oxidization in order to open the looped closed structures generated by the graphizing heat treatment transiently. This severs the loop on the powder surface (terminal end of the carbon network layer or the c-planar layer) to provide graphite powders having a layered structure of the carbon network layers in which the terminal ends of the carbon network layer are scarcely coupled to other carbon network layers and in which the terminal ends of the carbon network layer are aligned in a flatter state, as shown in FIG. 10.

Although there is no particular limitation to the conditions for oxidizing heat treatment provided that the looped closed structures are opened on oxidation, the heat treatment temperature is preferably on the order of 600 to 800° C. The reason is that graphite powders having the looped closed structures are high in oxidation resistance and are less susceptible to oxidation at a temperature lower than 600° C., with the oxidation proceeding rapidly at higher than 800° C. to accelerate deterioration of the graphite powders in their entirety. The oxidizing heat treatment time is usually one to ten hours depending on the temperature or the processing volume. The heat treatment atmosphere is an oxygen-containing atmosphere which may be pure oxygen atmosphere or a mixed atmosphere of oxygen and inert gases.

Since the powder surface is removed by this oxidizing heat treatment, the graphite powders loses weight by approximately 2 to 5%, with the powder size being slightly decreased by, for example, 1 to 2 μm. If necessary, this decrease in particle size is taken into account in setting the conditions for pulverization.

The processing for opening the looped closed structures is not limited to the oxidizing heat treatment. That is, any other suitable method may be used provided that the method used permits the surface structure of the graphite powders to be scraped off to open the looped closed structures to produce a layered structure of the flat carbon network layer. As the other method, there is, for example, a fluorinating heat treatment or a hydrogenating heat treatment. The heat treatment conditions in this case can be suitably set by experiments so as to permit opening of the looped closed structures.

If then the graphite powders are heat-treated in an inert gas atmosphere, the terminal ends of the open structure of the carbon network layer is connected to the terminal end of the other carbon network layer in a loop to constitute again a looped closed structure on the surface of the graphite powders.

When the terminal ends of the carbon network layers are connected in a loop, the terminal ends of the carbon network layer on the graphite powder surface are flattened by oxidizing heat treatment. Therefore, two separated layers are interconnected only on extremely rare occasions, such that a large looped closed structure made up of a large number of loops of carbon network layers is hardly produced. The number of layers of the loops is 5 at most and usually 1 to 3. The result is that the number of the looped closed structures per unit length along the c-axis direction is increased to raise the interstitial planar section density. Specifically, interstitial planar section pitch can be reduced so that the interstitial planar section density, which is of an order of magnitude only slightly exceeding 100 per µm in the first method, can be increased to a large interstitial planar section density exceeding 200 per µm and even exceeding 500 per µm in the second method.

The inert gas atmosphere may be one or more of, for example, Ar, He or Ne. The heat treatment temperature which is able to induce lattice vibrations of relatively large amplitude sufficient to interconnect graphite layers suffices. The looped closed structures obtained on interconnection are lower in energy and higher in stability. Thus, sufficient lattice vibrations are produced on heat treatment in the inert gas atmosphere to interconnect opened terminal ends of the carbon network layers. To this end, the heat treatment at a temperature exceeding 800° C. is required. Although there is no particular limitation to the upper limit temperature, the practical maximum heating temperature under the current heating technique is of the order of 3200° C. The heat treatment time sufficient to form the looped closed structures may be used, and in general is 1 to 10 hours, although the processing time differs significantly with temperature and the processing quantity. For 1000° C., for example, the heat treatment time is approximately five hours.

During the oxidating heat treatment and the heat treatment in an inert gas atmosphere, the specific surface area of graphite powders is varied significantly. That is, graphite powders on oxidating heat treatment is roughed on its surface and has its closed structure opened, thus its specific surface area being increased. However, if the closed structure is again formed by the next heat treatment in the inert gas atmosphere, the specific surface area is decreased to revert to the specific surface area of the graphite powders prior to oxidating heat treatment, as has been confirmed by our experiments. Thus, ultimately, the specific surface area of graphite powders obtained on graphizing heat treatment is substantially maintained, so that the specific surface area can be controlled mainly by the pulverization conditions and the heat treatment conditions of carbonization and graphization.

With the second method, in distinction with the second method, interstitial planar section density can be increased by the second heat treatment following the graphization, so that pulverization need not be high-speed pulverization, while it can be performed after graphization.

If necessary, graphite powders obtained by the first or second method are classified to adjust the mean particle size. This classification need not be performed as the last operation. Thus, it can be performed at any stage followings pulverization and may also be performed twice or more at different stages.

The boron-containing graphite powders, having the looped closed structures on their surfaces, according to the present invention, are relatively low in boron contents, and hence may be used for the same application as that for the conventional graphite powders. Since the terminal ends of the carbon network layer (c-planar layer) of graphite are closed in a loop, and the density of the interstitial planar sections, as the intrusion site for lithium ions, is as high as 100 to 1500 per µm, the intercalating functions proper to graphite, such as doping, occlusion or insertion, are improved, so that other substances such as lithium ions can be stored in large quantities. Moreover, since the graphization temperature can be lowered significantly by the graphization catalyzing action proper to graphite, the graphite material improved in economic merits and storage functions can be furnished inexpensively.

Therefore, the graphite powders according to the present invention are particularly suited as the negative electrode material of the lithium ion secondary battery. Since the graphite powders according to the present invention have numerous interstitial planar sections and void type defects, as the main intrusion sites for Li ions, Li ions can be intruded easily, such that more Li ions than conventionally get to the graphite storage region to increase the Li ion storage quantity. The result is that a lithium ion secondary battery having improved discharging capacity can be produced. Since the carbon network layer of graphite has the looped closed structures, which render it difficult for the electrolytic solution to be intruded into the graphite, the cyclic durability in case of repeated charging/discharging is prolonged. Moreover, in the preferred embodiment, the charging/discharging efficiency is simultaneously improved due to the small specific surface area.

If the graphite powders of the present invention are used for this purpose, the negative electrode of the lithium ion secondary battery employing the graphite powders may be manufactured by the same method as the conventional method. In general, the graphite powders are turned into an electrode by molding the graphite powders on a current collector using a suitable binder. That is, the negative electrode material is composed of graphite powders as a main constituent and a small amount of a binder. However, the electrode may also be a sintered negative electrode composed essentially only of graphite powders. As a current collector, an optional metal foil, such as a copper foil, e.g., an electrolytic copper foil or a rolled copper foil etc, which is able to carry graphite powders satisfactorily and which is not susceptible to elution on decomposition when used as a negative electrode, can be employed.

The above-mentioned molding can be executed by any suitable method conventionally used for preparing an electrode from powdered active materials. There is no particular limitation to the molding methods insofar as the performance of the graphite powders as the negative electrode is sufficiently manifested and the powders can be molded satisfactorily with high chemical and electrical stability. Among the preferred molding methods, there are a screen printing method, a thermal pressure bonding method and a slurry coating method. The scree printing method includes adding a binder composed of fluorine resin powders, such as powders of polytetrafluoroethylene, polyvinylidene fluoride etc and an organic solvent such as isopropyl alcohol to graphite powders, kneading the respective components together to a paste, and screen printing the resulting paste on the current collector. The thermal pressure bonding method adds resin powders, such as polyethylene or polyvinyl alcohol powders, to graphite powders, dry mixing the respective components, molding the resulting mixture by hot-pressing using a metal mold and simultaneously thermally affixing the molded product onto the current collector. Finally, the slurry coating method slurrying the graphite powders in a solvent, such as N-methyl pyrrolidone, dimethyl formamide, water or alcohol, using the above-mentioned water-soluble caking agent, such as carboxy methyl cellulose, or powders of fluorine resin, as a binder, coating this slurry on the current collector and drying the coated current collector.

The graphite powders of the present invention can be combined with a non-aqueous electrolytic solution, obtained on dissolving lithium compound in a suitable organic solvent, and an active material for a positive electrode, that can be used for the lithium ion secondary battery, to fabricate a lithium ion secondary battery.

As the active material fort the positive electrode, use may be made of lithium-containing transition metal oxides $LiM^1_{1-x}M^2_xO_2$ or $LiM^1_{2y}M^2_yO_4$, where x and y are numerical figures such that $0 \leq x \leq 4$ and $0 \leq y \leq 1$, $M^1$ and $M^2$ denote at least one of transition metals of Co, Ni, Mn, Cr, Ti, V, Fe, Zn, Al, In and Sn, transition metal chalcogen compounds, vanadium oxides, such as $V_2O_5$, $V_6O_{13}$, $V_2O_4$ and $V_3O_8$, lithium compounds thereof, chevrel phase compounds represented by the general formula $M_xMo_6S_{8-y}$, where x and y are numerical figures such that $0 \leq x \leq 4$ and $0 \leq y \leq 1$, and M is a metal, especially a transition metal, activated charcoal, active carbon fibers etc.

There is no particular limitation to the organic solvents used in the non-aqueous electrolytic solution. Examples of the organic solvent include one or more of propylene carbonate, ethylene carbonate, dimethyl carbonate, diethyl carbonate, 1,1- and 1,2-dimethoxy ethane, 1,2-diethoxy ethane, γ-butyrolactam, tetrahydrofuran, 1,3-dioxolan, 4-methyl-1, 3-dioxolan, anisole, diethyl ether, sulforan, methyl sulforan, acetonitrile, chloronitrile, propionitrile, trimethyl borate, trtramethyl silicate, nitromethane, dinethyl formamide, N-methyl pyrrolidone, ethyl acetate, trimethyl ortho-formate and nitrobenzene.

As the lithium compounds of the electrolytes, use may be made of organic or inorganic lithium compounds soluble in the organic solvents used. Examples of suitable lithium compounds include one or more of $LiClO_4$, $LiBF_4$, $LiPF_6$, $LiAsF_6$, $LiB(C_6H_5)$, LiCl, LiBr, $LiCF_3SO_3$ or $LiCH_3SO_3$.

EXAMPLES

The present invention is hereinafter explained with reference to Examples and Comparative Examples. These Examples are merely illustrative and are not intended to limit the present invention. In these Examples and Comparative Examples, the graphite powders were measured in the following manner.

B content: measured in accordance with the chemical analytic method for high-purity graphite materials prescribed in JIS R7223.

Particle Size Distribution: measured using a laser diffraction/scattering type grain size measurement device.

Specific Surface Area: found by a BET one point measurement method by the $N_2$ substitution method.

Crystallite Size: found by analyzing the 002 diffraction peak of the powder method X-ray diffraction diagram based on the 117th Committee of Japan Society of Promotion of Science. The 002 diffraction peak was measured under the condition of the acceleration voltage of 40 kV, the current intensity of 150 mA and a measurement range of 20 to 90°, using an X-ray diffractometer manufactured by Mac Science Inc. Although the upper limit of the crystallite diameter as prescribed by the 117th Committee of Japan Society of Promotion of Science is 1000 Å, the same method is directly applied to samples exceeding 1000 Å to calculate the crystallite diameter. d002: a value calculated by the lattice constant precision measurement method by the least square method, inclusive of the diffractometer error, from the X-ray diffraction diagram (inner standard not being used). The totality of peak positions of the surface indices (002), (100), (101), (004), (110), (112), (006) of the X-ray diffraction diagram were used. X-ray diffraction measurement was carried out thrice and a weighted mean of the obtained values was found as being the value of d002.

Example 1

The present Example 1 illustrates manufacture of boron-containing graphite powders having the looped closed structures of the present invention by the first method.

Using an impact crusher ("hammer mill μ-miser" manufactured by Fuji Powdal), the bulk mesophase obtained from coal tar pitch was pulverized for five minutes per 10 kg at an rpm of 7500. The resulting bulk mesophase powders were carbonized on heating at 1000° C. for one hour under an argon atmosphere for carbonization in order to produce powders of a carbon material. To these powders of the carbon material were added powders of $B_4C$ (boron carbide) having the size not larger than 45 μm in an amount of 0.01 to 6.5 wt % of B referred to the total amount of the addition product. The resulting mass was mixed together mechanically and the resulting powder mixture was heat-treated in an argon atmosphere for 30 minutes at a temperature of 2500 to 3000° C. for graphization in order to obtain graphite powders.

In these graphite powders, looped closed structures were clearly observed from a photo taken with a high resolution electronic microscope, as exemplified in FIG. 7, in which an arrow denotes an interstitial planar section. The density of the interstitial planar sections as found from the photo was only slightly in excess of 100 per μm at optional heat treatment temperatures. The B content and d002 of the graphite powders were found as described above.

The produced graphite powders were classified and used for the preparation of the electrodes in the following manner. The mean particle size of the graphite powders was approximately 15 μm.

90 parts by weight of the graphite powders and 10 parts by weight were mixed in a solvent N-methyl-pyrrolidone, dried and formed into a paste. The resulting paste-like negative electrode material was coated to a uniform thickness on a copper foil 20 μm thick, acting as a current collector, using a doctor blade, and was dried at 80° C. A test piece, having an area of 1 cm², sliced from the resulting product, was used as a negative electrode.

The evaluation of the negative electrode characteristics was carried out by a constant current charging/discharging test by a three electrode cell employing metal lithium for a counter-electrode and a reference electrode. The electrolytic solution used was a 1 mol/lit solution of $LiClO_4$ in a mixed solvent of ethylene carbonate and dimethyl carbonate.

The discharging capacity was measured by charging at a current density of 0.3 mA/cm² until a vs-Li reference electrode (vs Li/Li+) potential reached 0.0 V and by discharging at the same current density until the vs-Li reference electrode (vs Li/Li+) potential reached +1.50 V. The charging capacity/discharging capacity ratio (%) was calculated and used as a charging/discharging efficiency. The results are shown in Table 1, in which there are also shown the inter-layer distance values d002 as measured by the X-ray diffraction method.

Example 2

The present Example 2 illustrates the manufacture of boron-containing graphite powders having the looped closed structures of the present invention by the second method.

The bulk mesophase pitch, obtained from the coal tar pitch, was pulverized, carbonized, admixed with $B_4C$ powders and graphizing-heat-treated in the same way as in Example 1 to produce graphite powders. The temperature for the graphizing heat treatment of 2500° C. was used.

The resulting graphite powders were subjected to oxidating heat treatment in the pure oxygen atmosphere at 700° C. for three hours followed by heat treatment in the Ar atmosphere at 1000° C. for five hours.

A high resolution electronic microscope photograph of the cross-section in the vicinity of the surface of the graphite powders from the oxidating heat treatment indicated that the looped closed structures as seen on the surface of the graphite powders (FIG. 7) were substantially completely opened to present a flat open surface structure.

A high resolution electronic microscope photograph after heat-treating the graphite powders heat-treated in an Ar atmosphere after the oxidating heat treatment indicated that looped closed structures were again formed on the powder surface opened by the oxidation processing. The density of the interstitial planar sections, as found from this photo, was approximately 770/μm, which is approximately one-half the theoretical maximum density of the interstitial planar sections of 1500/μm for the case of single-layer loops. Therefore, an average number of loop layers of each looped closed structure is approximately 2.

Using the graphite powders, the electrodes were prepared in the same way as in Example 1, at the same time as the performance of the negative electrode was evaluated. The results are shown in Table 1 along with the measured values of the B content and d002.

In the preferred Example, the density of the interstitial planar sections was 770/μm, as mentioned previously. However, if heat treatment in the Ar atmosphere after the oxidating heat treatment is carried out more moderately, such as at a lower temperature, coupling to remote carbon network layers is less liable to occur thus increasing the density of the interstitial planar sections.

Comparative Example 1

The bulk mesophase obtained from the coal tar pitch was pulverized, carbonized and graphizing-heat-treated in the same way as in Example 1 to produce graphite powders. It is noted that boron was not added and that the graphizing heat treatment was carried out at 2500 to 3000° C.

From a photograph of a high resolution electronic microscope of the produced high resolution electronic microscope, the density of the interstitial planar sections was measured. It was found that the density of the interstitial planar sections was approximately equivalent to that of Example 1, that is slightly above 100 per μm, for any heat treatment temperatures used.

Using these graphite powders, the electrodes were prepared and the performance of the negative electrode was evaluated, in the same way as in Example 1. The results are shown in Table 1, along with the measured values of the B content and d002.

TABLE 1

| Ex. Nos. | graphization method | graphization temperature (° C.) | density of interstitial planar sections per μm | d002 (Å) | discharging capacity (mAh/g) | charging/ discharging efficiency (%) | amount of addition of $B_4C$ (wt %) | analyzed value of B quantity (wt %) |
|---|---|---|---|---|---|---|---|---|
| Ex. 1 | 1 | 2500 | 108 | 3.356 | 341 | 92 | 5.0 | 4.1 |
| | | 2800 | 110 | 3.355 | 342 | 93 | 5.0 | 4.0 |
| | | 3000 | 105 | 3.354 | 344 | 93 | 5.0 | 4.0 |
| | | 2500 | 104 | 3.362 | 328 | 94 | 0.011 | 0.01 |
| | | 2500 | 107 | 3.354 | 340 | 92 | 5.3 | 5.0 |
| Ex. 2 | 2 | 2500 | 770 | 3.357 | 357 | 92 | 5.0 | 3.9 |
| Comp. Ex. 1 | 1 | 2500 | 107 | 3.370 | 305 | 94 | — | ND |
| | | 2800 | 109 | 3.367 | 321 | 93 | — | ND |
| | | 3000 | 105 | 3.366 | 325 | 93 | — | ND |

As may be seen from Table 1, a sample not admixed with boric acid has the interlayer distance d002 of the c-plane layer is 3.370 Å, and remains at 3.363 Å even if the heat treatment temperature is raised to 3000° C., such that the interlayer distance d002 cannot approach to an ideal value of 3.354 Å.

If, in accordance with the present invention, a small amount of boron is added to effect graphizing heat treatment, d002 becomes smaller to 3.354 to 3.363 Å depending on the amount of addition of boron, even if the heat treatment temperature is relatively low at 2500° C. Thus, d002 becomes smaller than its value for the heat treatment temperature of 3000° C. without addition of boron. If the heat treatment temperature is increased, d002 tends to be smaller. However, the effect of the amount of boron addition on d002 is larger than that of heat treatment temperature. Thus, graphite powders with a low value of d002 may be obtained by addition of boron even if the heat treatment temperature is low.

That is, d002 cannot be lowered beyond approximately 3.360 Å, in the absence of boron addition, even if the heat treatment temperature is raised significantly. However, if boron is added, d002 can be made lower than 3.360 Å at a lower heat treatment temperature, while the ideal value of 3.354 Å can also be achieved, as may be seen from Table 1.

There is a high correlation between the d002 value and the discharging capacity, as may also be seen from Table 1, such that, the smaller the value of d002, the larger becomes the discharging capacity. Therefore, addition of boron that is able to realize a small value of d002 by low-temperature graphization is effective to increase the discharging capacity. Moreover, if the second method, in which the looped closed structures are opened after graphizing heat treatment and subsequently again closed, is used, the density of the interstitial planar sections is markedly increased, that is the pitch of the interstitial planar sections is markedly smaller. This increase in the density of the interstitial planar sections also further increases the discharging capacity.

It has been shown that, by lowering the graphization temperature by boron addition and by controlling the looped closed structures, according to the present invention, a negative electrode material for a lithium ion secondary battery having a discharging capacity exceeding 330 mAh/g can be achieved even with the graphizing heat treatment temperature of 2500° C. It has also been shown that the looped closed structures can be controlled in the same way as in the case of the material not admixed with boron without regard to boron addition.

Example 3

Using the bulk mesophase, obtained from the coal tar pitch, and to which was added 1 wt % of $B_4C$ prior to graphizing heat treatment, graphite powders were produced by the first method, as in Example 1. The rpm of the crusher used for pulverizing the bulk mesophase, as a starting material, was set to 7500, with the pulverizing time duration being changed. The graphizing heat treatment was carried out at 2500° C. The B content of the produced graphite powders, sieved to 5 to 63 μm, the density of the interstitial planar sections of the closure structure, d002 and the specific surface area are shown in Table 2 along with the pulverizing conditions. The results of measurement of the performance of the negative electrode of these graphite powders, that is the discharging capacity and the charging/discharging efficiency, are also shown in Table 2. The discharging capacity and the charging/discharging efficiency were measured as stated in Example 1.

Example 4

Using the bulk mesophase, obtained from the coal tar pitch, graphite powders were prepared by the second method, as in Example 2. $B_4C$ was added and mixed prior to graphizing heat treatment. The rpm of the crusher used in pulverizing the bulk mesophase as the starting material was set to 7500, with the pulverizing time being changed. The graphizing heat treatment was carried out at 2500° C.

The B content of the produced graphite powders, sieved to 5 to 63 μm, the density of the interstitial planar sections of the closure structure, d002 and the specific surface area are shown in Table 2 along with the pulverizing conditions. The results of measurement of the discharging capacity and the charging/discharging efficiency of these graphite powders are also shown in Table 2.

Comparative Example 2

Using the bulk mesophase, obtained from the coal tar pitch, the graphite powders were prepared by the first method in a similar manner to Example 3, that is by performing graphizing heat treatment at 2500° C. after addition of 1 wt % of $B_4C$. However, the rpm of the crusher was lowered to 4500 rpm, with the pulverization time duration being also changed.

The B content of the produced graphite powders, sieved to 5 to 63 μm, the density of the interstitial planar sections of the closure structure, d002 and the specific surface area are shown in Table 2 along with the pulverizing conditions. The results of measurement of the discharging capacity and the charging/discharging efficiency of the graphite powders are also shown in Table 2.

TABLE 2

| Ex. Nos. | method | rpm of crusher | pulverizing time (min) | density of interstitial planar sections/ (μm) | d002 (Å) | B content (wt %) | specific surface area ($m^2/g$) | discharging capacity (mAh/g) | charging/ discharging efficiency (%) |
|---|---|---|---|---|---|---|---|---|---|
| Ex. 3 | 1 | 7500 | 5 | 103 | 3.357 | 0.76 | 0.56 | 343 | 96 |
|  |  |  | 15 | 104 | 3.356 | 0.73 | 0.61 | 342 | 96 |
|  |  |  | 30 | 105 | 3.356 | 0.84 | 0.99 | 343 | 91 |
|  |  |  | 45 | 104 | 3.356 | 0.81 | 1.51 | 341 | 85 |
|  |  |  | 60 | 106 | 3.356 | 0.72 | 2.99 | 342 | 81 |
| Ex. 4 | 2 | 7500 | 5 | 771 | 3.356 | 0.74 | 0.57 | 356 | 96 |
|  |  |  | 30 | 769 | 3.357 | 0.75 | 1 | 357 | 90 |
| Comprising:. Ex. 2 | 1 | 4500 | 5 | 81 | 3.358 | 0.74 | 0.56 | 317 | 94 |
|  |  |  | 45 | 79 | 3.357 | 0.76 | 0.99 | 315 | 89 |
|  |  |  | 100 | 80 | 3.357 | 0.72 | 3 | 316 | 82 |

In the above Table, the crystallite diameter ranges between 232 and 264 Å, with the mean particle size being approximately 15 μm.

As may be seen from Table 2, the longer the pulverizing time duration, the larger becomes the specific surface area of the produced graphite powders. However, the density of the interstitial planar sections and hence the discharging capacity were substantially not affected by the specific surface area. As in Table 1, a high discharging capacity exceeding 340 mAh/g was obtained when the density of the interstitial planar sections exceeds 100/μm. In particular, with the graphite powders having the high density of the interstitial planar sections, obtained by the second method, an extremely high value of the discharging capacity exceeding 355 mAh/g is achieved.

On the other hand, the specific surface area influences the charging/discharging efficiency, such that, with the specific surface area exceeding 1.0 $m^2/g$, the charging/discharging efficiency is lowered, whereas, if the specific surface area is smaller than 1.0 $m^2/g$, a high charging/discharging efficiency not lower than 90% is achieved.

It is also seen from comparison of Examples 3 and 4 that, if oxidating heat treatment and heat treatment in an inert atmosphere are carried out after the graphizing heat treatment to lower the pitch in accordance with the second method, the specific surface area is substantially not changed.

If the rpm of the crusher is low, that is if the pulverization is not carried out at an elevated speed, as in Comparative Example 2, the density of the interstitial planar sections remains to be on the order of 80/μm, such that the discharging capacity is at a lower value between 310 and 311 mAh/g, even though B is contained in the graphite powders.

quently processed with oxidating heat treatment and heat treatment in an argon atmosphere.

The measured results of the B content, density of the closure structure, specific surface area, crystallite diameter, mean particle size, discharging capacity and the charging/discharging efficiency are shown collectively in Table 3 along with the rpm of the crusher.

TABLE 3

|  | method | rpm hammer | rpm disc | density of interstitial planar sections (μm) | B content (wt %) | specific surface area (m²/g) | crystallite diameter (Å) | mean particle size (μm) | discharging capacity (mAh/g) | charging/discharging efficiency (%) |
|---|---|---|---|---|---|---|---|---|---|---|
| Ex. 5 | 1 | 6000 | 50 | 106 | 0.78 | 0.98 | 1947 | 22.5 | 348 | 93 |
|  |  | 6000 | 200 | 107 | 0.74 | 0.92 | 204 | 21.9 | 340 | 94 |
|  |  | 6000 | 150 | 104 | 0.76 | 0.89 | 1238 | 21.8 | 344 | 92 |
|  |  | 6700 | 150 | 9.4 | 0.75 | 0.93 | 1147 | 20.9 | 358 | 91 |
|  |  | 7400 | 150 | 1298 | 0.72 | 0.91 | 987 | 22.1 | 359 | 92 |
|  |  | 8000 | 150 | 1475 | 0.81 | 0.94 | 1189 | 19.4 | 361 | 94 |
| Ex. 6 | 2 | — | 50 | 765 | 0.82 | 0.88 | 1768 | 19.7 | 349 | 93 |
|  |  | — | 150 | 943 | 0.79 | 0.91 | 1224 | 18.7 | 344 | 91 |
|  |  | — | 200 | 1199 | 0.74 | 0.97 | 239 | 21.2 | 341 | 93 |

Example 5

The present Example 5 is directed to manufacture of graphite powders having the closure structure of the present invention by the first method.

A bulk mesophase pitch, obtained from the coal tar pitch, was carbonized at 1000° C. in an argon atmosphere to produce a carbon material which was pulverized so that approximately 90 vol. %. of the powders is within the particle size range of 1 to 80 μm. For pulverization, a hammer mill and a disc crusher were used in this order. The hammer mill used was the same as that used in Example 1, with the rpm ranging between 6000 and 8000. The disc crusher with the rpm ranging between 50 and 200 rpm was used. The pulverization time duration was set to five minutes for pulverization by the hammer mill and that by the disc crusher.

The carbon material, pulverized by the hammer mill and the disc crusher, was admixed with 1 wt % of $B_4C$, as in Example 1, and the mixture was then heat-treated for graphization at 2500° C. in order to produce graphite powders.

The measured results of the B content, density of the closure structure, specific surface area, crystallite diameter, mean particle size, discharging capacity and the charging/discharging efficiency are shown collectively in Table 3 along with the rpm of the crusher.

Example 6

The present Example is directed to manufacture of graphite powders having the closure structure of the present invention by the second method.

A bulk mesophase pitch, obtained from the coal tar pitch, was carbonized at 1000° C. in an argon atmosphere to produce a carbon material which was then pulverized so that approximately 90 vol. % of the powders will be in a particle size range of from 1 to 80 μm. The carbon material was pulverized using only a disc crusher which was used in a rpm ranging between 50 and 200.

The carbon material pulverized by the disc crusher was admixed with 1 wt % of $B_4C$, as in Example 2. The resulting mixture was graphizing heat treated at 2500° C. subsequently processed with oxidating heat treatment and heat treatment in an argon atmosphere.

The pulverization time duration was approximately 5 minutes, with d002 ranging between 3.3560 and 3.3600, for each case.

With the first method, graphite powders having the density of the interstitial planar sections of the closure structure following graphization as high as 100 or more per μm and the crystallite diameter ranging between 100 and 2000 Å were obtained by pulverization employing both a hammer mill and a disc crusher. It is seen that the density of the interstitial planar sections and the crystallite diameter are mainly controlled by the rpm of the hammer mill and that of the disc crusher, respectively. If the rpm of the disc crusher is increased, graphite powders having the density of the interstitial planar sections close to an upper limit of 1500 per μm could be obtained even with the use of the first method.

With the second method, graphite powders having an extremely high density of the interstitial planar sections of the closed structure and superior discharging characteristics comparable to those of Examples 2 and 4 could be obtained simply by pulverization using a disc crusher at an rpm of 50 to 200.

Example 7

Figure 1A:
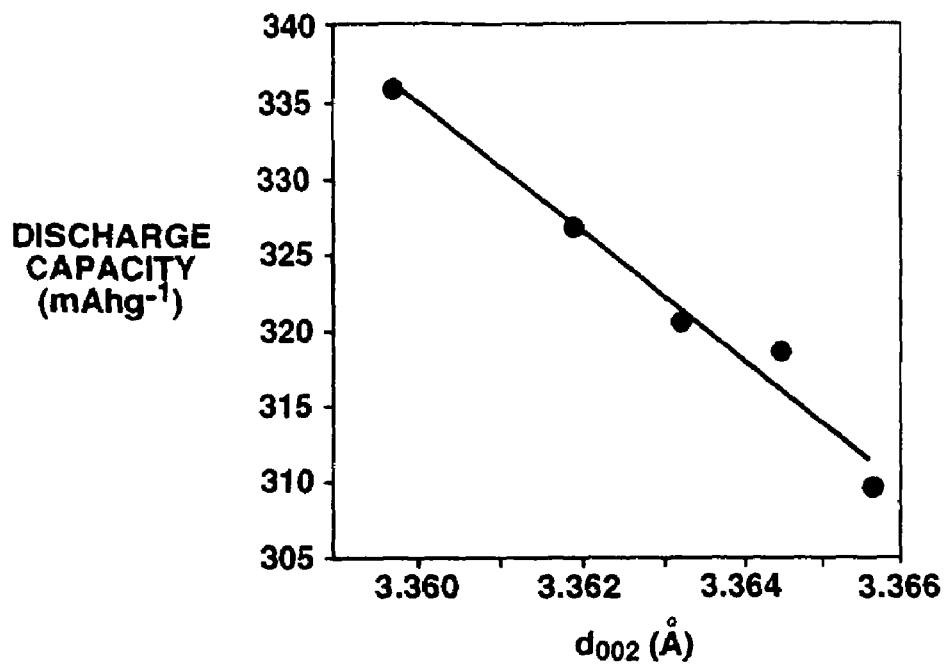
FIG. 1a shows an example of the relation between d002 and the discharging capacity of a graphite material and FIG. 1b shows an example of the relation between the graphization temperature and d002 in a graphite material.
Figure 1B:
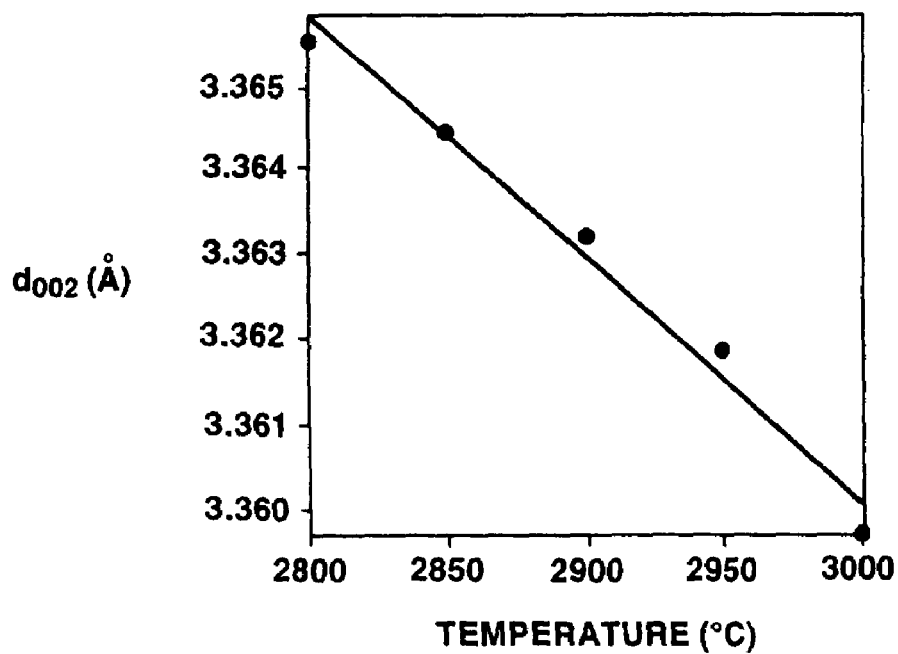
Figure 2:
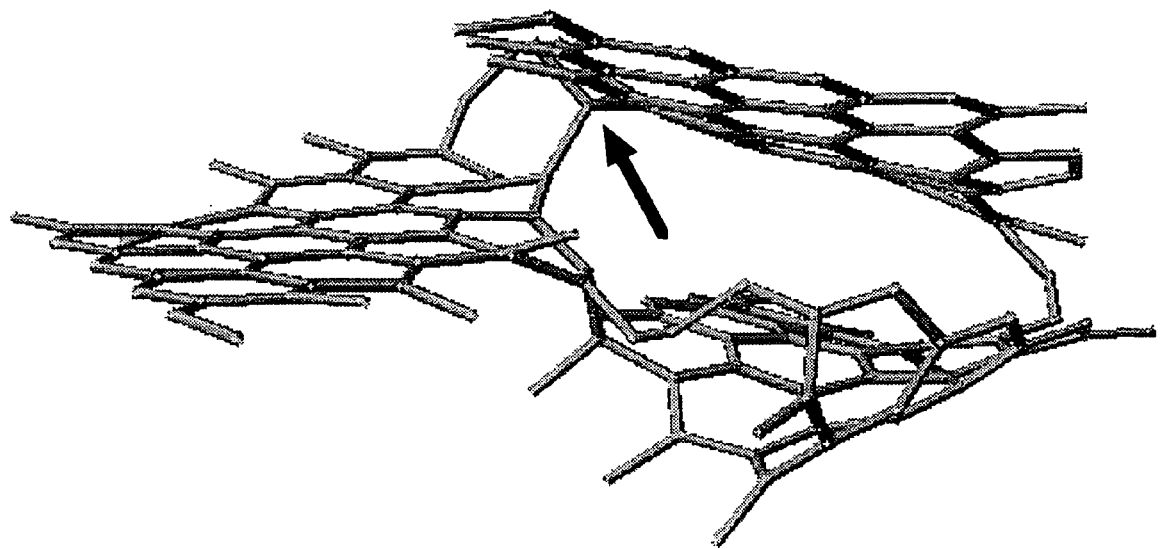
FIG. 2 shows an example of a disturbed carbon network by computer simulation, with an arrow indicating four ligancy carbon.
Figure 3:
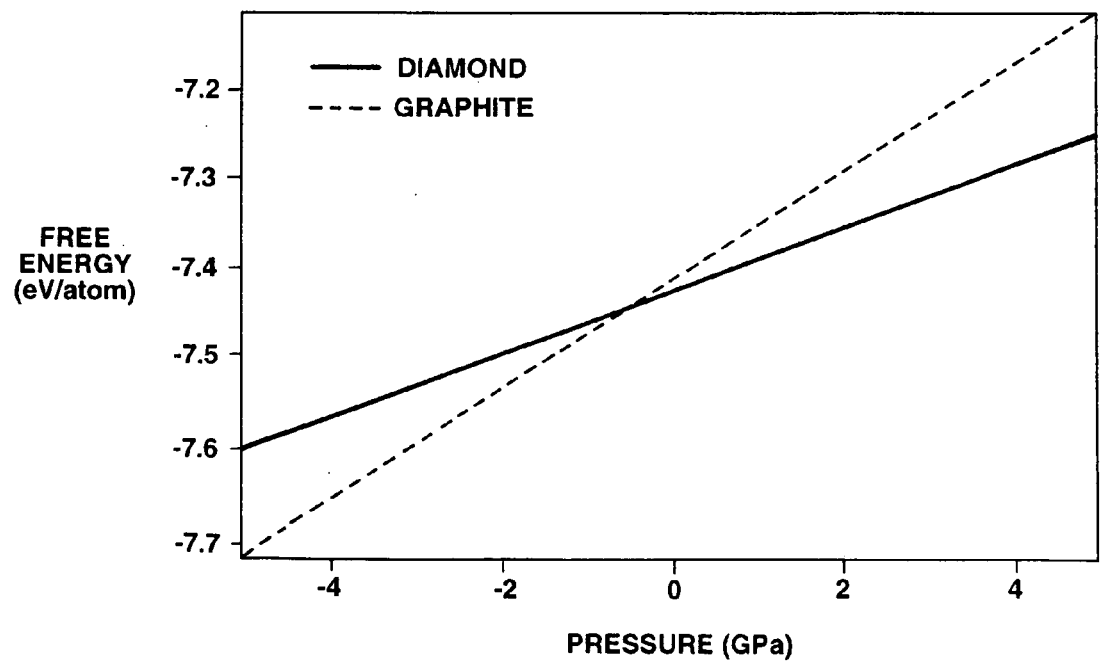
FIG. 3 shows the relation between the free energy and the pressure at an absolute 0° of the graphite and the diamond by theoretical calculations.
Figure 4:
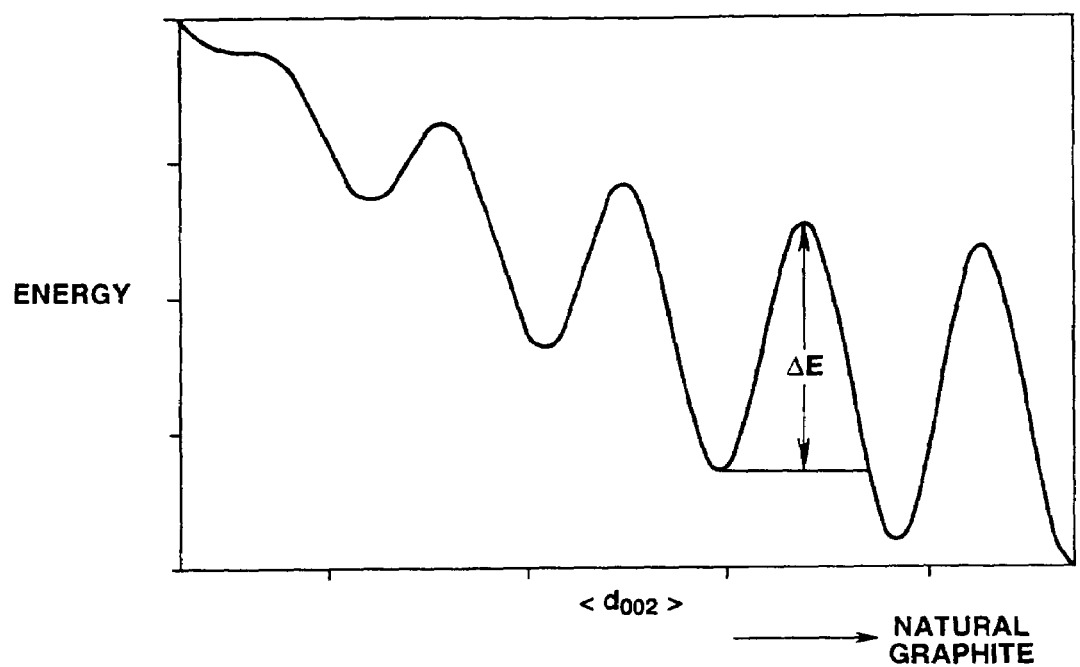
FIG. 4 is a schematic view showing the relation between d002 in the graphite-based carbon material and the structural energy.

By the first method, graphite powders were produced in the same way as in Example 1. The graphizing heat treatment was effected for a heat-treatment time duration of 30 minutes, as the rpm of a crusher at the time of pulverization of the starting material was set to 7500, with the pulverization time duration of five minutes, 1 wt % of $B_4C$ was added to the carbon material prior to graphizing heat treatment and as the heat treatment temperature was varied. The density of the interstitial planar sections of the closure structure and various characteristic values of the produced graphite powders are shown in FIG. 4 along with the discharging capacity and the charging/discharging efficiency.

Example 8

By the second method, graphite powders were produced in the same way as in Example 1. The graphizing heat treatment was effected for a heat-treatment time duration of 30 minutes, as the rpm of a crusher at the time of pulverization of the starting material was set to 4500, with the pulverization time duration of five minutes, 1 wt % of $B_4C$ was added to the carbon material prior to graphizing heat treatment and as the heat treatment temperature was varied. The graphite powders, obtained by graphizing heat treatment, were subjected to oxidating heat treatment in an oxygen atmosphere at 650° C. for two hours and then to heat treatment in an argon atmosphere at 1000° C. for five hours. The density of the interstitial planar sections of the closure structure and various characteristic values of the produced graphite powders are shown in FIG. 4 along with the discharging capacity and the charging/discharging efficiency.

carbonaceous material, 1 wt % of $B_4C$ was added to the carbon material prior to graphizing heat treatment and the graphizing heat treatment was carried out at 2500° C.

The produced graphite powders were classified by sieving for sorting the powders to a number of groups with different mean particle sizes. The density of the interstitial planar sections of the closure structure and characteristic values of the respective groups of the graphite powders are shown in Table 5 along with discharging capacity and charging/discharging efficiency.

Figure 5:
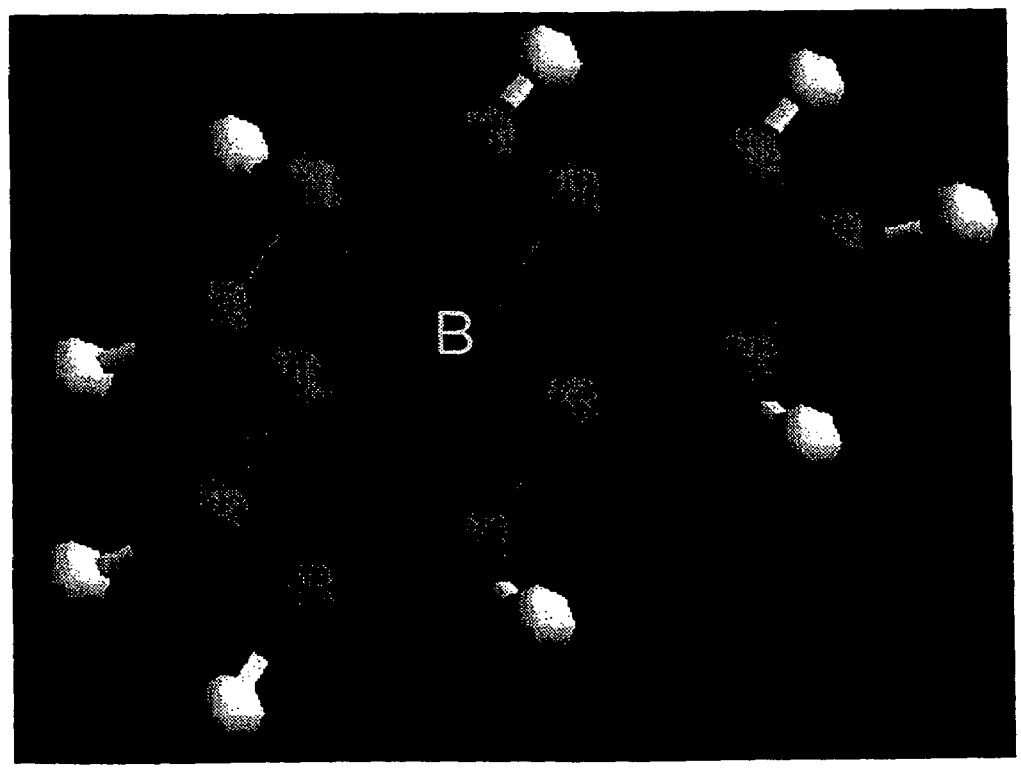
FIG. 5 shows a stable structure in the carbon network of substituting boron obtained by the molecular orbital method.
Figure 6:
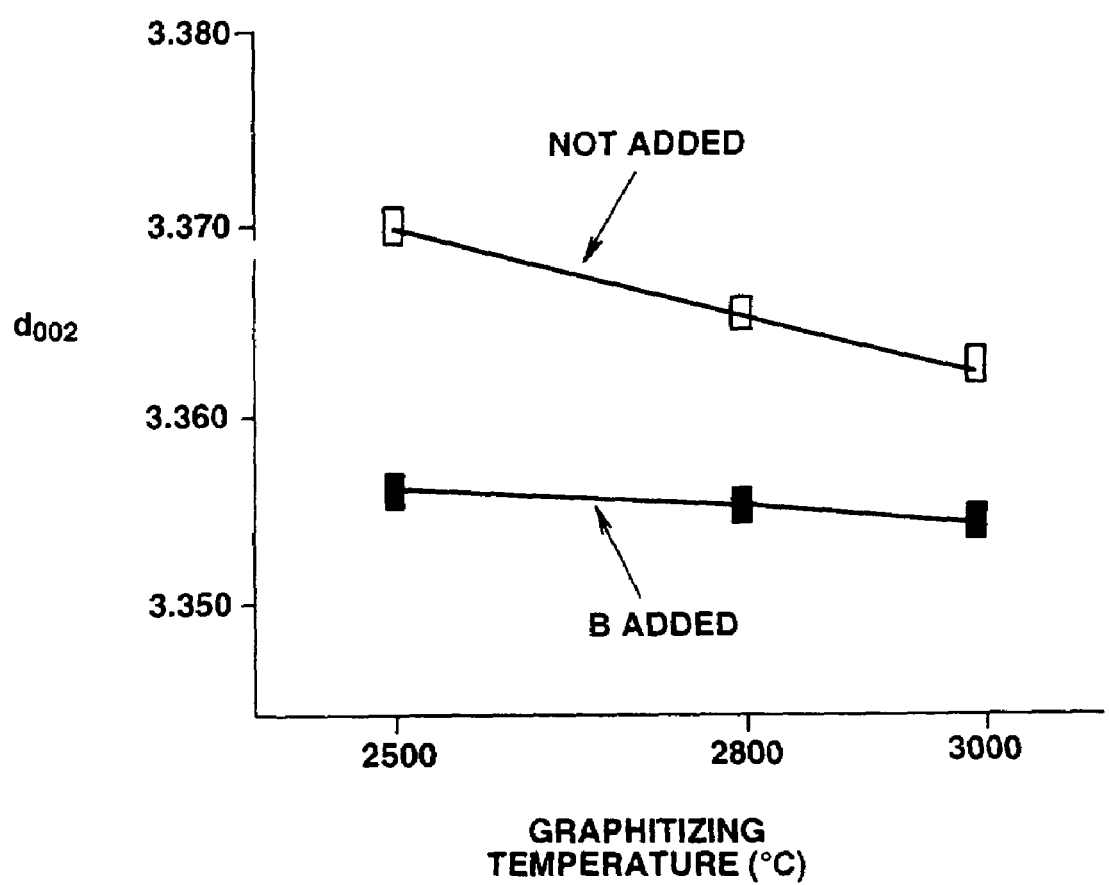
FIG. 6 is a graph showing the relation between the graphization temperature and d002 of a material admixed with boron and a material not admixed with boron.

Also, the bulk density and stability of the electrode plate quality were checked in the following manner. The results are also collectively shown in FIG. 5.

TABLE 4

| | method | rpm of crusher | graphization temperature (° C.) | density of interstitial planar sections/ μm | B content (wt %) | specific surface area (m²/g) | d002 (Å) | mean particle size (μm) | discharging capacity (mAh/g) | charging/ discharging efficiency (%) |
|---|---|---|---|---|---|---|---|---|---|---|
| Ex. 7 | 1 | 7500 | 1450 | 103 | 0.92 | 0.61 | 3.3693 | 22.6 | 291 | 93 |
| | | 7500 | 1500 | 103 | 0.91 | 0.62 | 3.3648 | 21.8 | 326 | 94 |
| | | 7500 | 2000 | 104 | 0.89 | 0.59 | 3.3601 | 21.9 | 334 | 92 |
| | | 7500 | 2500 | 103 | 0.77 | 0.64 | 3.3591 | 20.8 | 342 | 91 |
| | | 7500 | 2900 | 102 | 0.61 | 0.66 | 3.3568 | 22 | 347 | 92 |
| | | 7500 | 3000 | 104 | 0.53 | 0.62 | 3.3557 | 19.5 | 353 | 94 |
| Ex. 8 | 2 | 4500 | 1450 | 500 | 0.94 | 0.76 | 3.3694 | 19.6 | 297 | 93 |
| | | 4500 | 1500 | 499 | 0.92 | 0.77 | 3.3647 | 18.9 | 330 | 91 |
| | | 4500 | 2000 | 501 | 0.86 | 0.73 | 3.36 | 21.3 | 339 | 93 |
| | | 4500 | 2500 | 499 | 0.74 | 0.75 | 3.359 | 20.4 | 350 | 94 |
| | | 4500 | 2900 | 500 | 0.64 | 0.76 | 3.3567 | 22.3 | 357 | 95 |
| | | 4500 | 3000 | 501 | 0.52 | 0.72 | 3.3556 | 21.3 | 362 | 94 |

The pulverization time duration was five minutes. The crystallite diameter was 210 to 237 Å, with the mean particle size being approximately 21 to 23 μm in each case.

As may be seen from Table 4, the higher the graphization temperature, the smaller is the value of d002, and hence the higher is the crystallinity. With the crystallinity being higher, the charging/discharging efficiency was improved without affecting the charging/discharging efficiency.

Particularly noteworthy is the fact that, by the boron addition, there may be obtained graphite powders having high crystallinity of not higher than 3.3650 Å in terms of d002, as a result of which graphite powders having a high discharging capacity not lower than 320 mAh/g are obtained. However, if the heat treatment temperature is lower than 1500° C., only graphite powders with d002 higher than 3.3650 Å are obtained, with the discharging capacity being lower.

If no boron is added to graphite powders, it is not possible to produce graphite powders exhibiting high discharging capacity of not less than 320 mAh/g, with d002 being not larger than 3.3650 Å, unless the graphizing heat treatment temperature is set to not lower than 2800° C. It is therefore possible to lower the graphizing heat treatment temperature by 1000° C. or more by boron addition, thus significantly lowering the manufacturing cost of the graphite powders.

Example 9

By the first method, graphite powders were prepared in the same way as in Example 1. The rpm of the crusher at the time of pulverization of the starting material was set to 7500, with the pulverization time duration of 5 minutes. To the Bulk Density The bulk stability of powers is an index of relative ease in charging (chargeability) of the powders and governs the energy density per unit volume of the electrode. Thus, the bulk density was measured in accordance with the tap density measurement method prescribed in JIS Z2500, with the number of tape being 10. The powder chargeability was evaluated as being good (o) and poor (x) if the bulk density is not less than 1.17 g/cc and less than 1.17 g/cc, respectively.

Stability of the Electrode Plate Quality

If large-sized particles exist on the electrode plate, the thin separator plate tends to be pierced to cause shorting. Thus, the graphite powders in which particles having the particle size exceeding 200 μm as measured by the laser diffraction type grain size distribution meter account for 50 vol % or more were evaluated as being poor (x), with other particles being evaluated as good (o). These large-sized particles are highly likely to be particles of indefinite shape having long-axis diameters greatly different from short-axis diameters and are difficult to remove if the short-axis diameters are smaller than the mesh size of the sieve.

Example 10

By the second method, graphite powders were prepared in the same way as in Example 2. The produced graphite powders were classified by sieving for sorting the powders to a number of groups with different mean particle sizes. The density of the interstitial planar sections of the closure structure and characteristic values of the respective groups of the graphite powders are shown in Table 5 along with discharging capacity and charging/discharging efficiency.

TABLE 5

| | method | rpm of crusher | density of interstitial planar sections (μm) | B content (wt %) | specific surface area (m²/g) | mean particle size (μm) | discharging capacity (mAh/g) | charging/ discharging efficiency (%) | bulk density | stability of electrode plate quality |
|---|---|---|---|---|---|---|---|---|---|---|
| Ex. 9 | 1 | 7500 | 103 | 0.72 | 1.68 | 4.3 | 343 | 90 | x | o |
| | | 7500 | 103 | 0.73 | 0.68 | 5.4 | 342 | 91 | o | o |
| | | 7500 | 104 | 0.74 | 0.54 | 32.1 | 341 | 95 | o | o |
| | | 7500 | 103 | 0.71 | 0.53 | 37.9 | 342 | 96 | o | x |
| Ex. 10 | 2 | 7500 | 769 | 0.71 | 1.65 | 4.4 | 353 | 90 | x | o |
| | | 7500 | 770 | 0.73 | 0.77 | 20.3 | 358 | 96 | o | o |
| | | 7500 | 773 | 0.71 | 0.64 | 34.8 | 354 | 95 | o | o |
| | | 7500 | 769 | 0.77 | 0.63 | 38.9 | 352 | 95 | o | x |

The pulverization time duration is five minutes. In each case, the crystallite diameter ranged between 245 and 277 Å, with d002 ranging between 3.356 and 3.600 Å.

If the mean particle size of the graphite powders becomes smaller and in particular to an extremely small size less than 5 μm, the charging/discharging efficiency of the electrode plate is lowered, while the bulk density is lower. On the other hand, if the mean particle size of the graphite powders is larger than 35 μm, the electrode plate quality is lowered in stability.

Example 11

Figure 12:
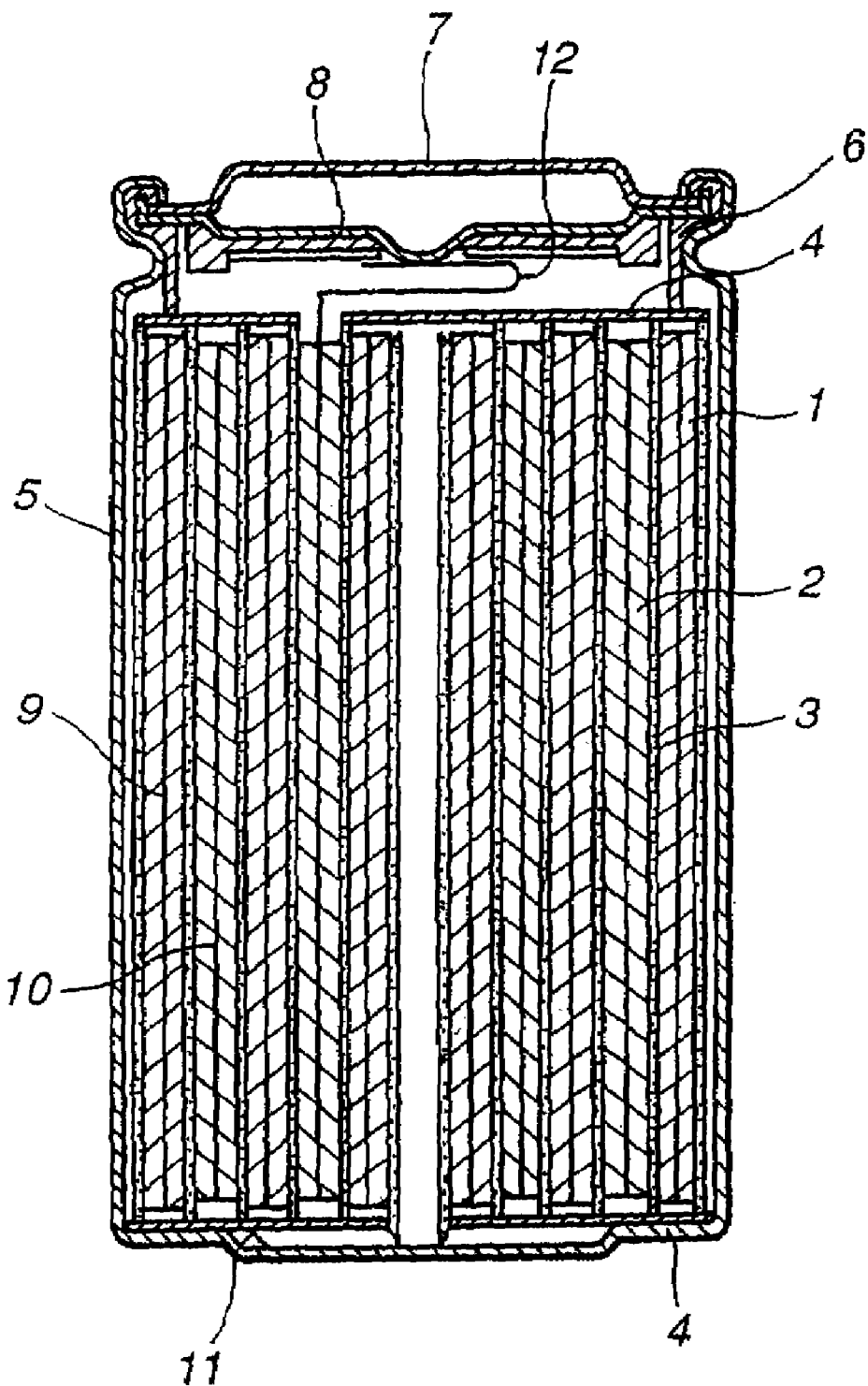
FIG. 12 is a cross-sectional view showing a lithium ion secondary battery manufactured in accordance with an Example of the present invention.

The present Example is directed to the manufacture of a cylindrically-shaped lithium ion secondary battery, configured as shown in FIG. 12, and which makes use of graphite powders obtained in the above-mentioned Examples 1 to 10 and Comparative Examples 1 and 2.

A negative electrode 1 was fabricated from a negative electrode material obtained on mixing 90 parts by weight of graphite powders and 10 wt % of polyvinylidene fluoride (PVDF) as a binder. This negative electrode material was dispersed in N-methyl pyrrolidone to prepare a paste-like slurry which was then coated on both sides of a strip-shaped copper foil, 10 μm in thickness, which subsequently serves as a negative electrode current collector 9. The resulting assembly was dried and compression-molded to prepare a strip-shaped negative electrode 1.

A positive electrode 2 was fabricated from LiCoO₂, obtained on firing a mixture 3) Battery Capacity: The discharging capacity was found by measuring the discharging time until the battery capacity reached 2.75 V with the constant current of 700 mA. If this time is 2.2 hours, 700 mA×2.2 h=1540 mAh is the discharging capacity. The charging/discharging was repeated under the above-mentioned conditions and the maximum discharging capacity obtained for the initial two to five cycles was used as the battery capacity. In the present Example, the battery capacity is a mean value of the battery capacities of 50 batteries.

TABLE 6

| Ex. Nos. | discharging capacity (mAh/g) | efficiency (%) | battery capacity (mAh) |
|---|---|---|---|
| Ex. 1 | 341 | 92 | 1584 |
| | 342 | 93 | 1594 |
| | 344 | 93 | 1599 |
| | 328 | 94 | 1569 |
| | 340 | 92 | 1582 |

TABLE 6-continued

| Ex. Nos. | discharging capacity (mAh/g) | efficiency (%) | battery capacity (mAh) |
|---|---|---|---|
| Ex. 2 | 357 | 92 | 1622 |
| Ex. 3 | 343 | 96 | 1620 |
| | 342 | 96 | 1617 |
| | 343 | 91 | 1581 |
| | 341 | 85 | 1530 |
| | 342 | 81 | 1501 |
| Ex. 4 | 356 | 86 | 1650 |
| | 357 | 90 | 1606 |
| | 362 | 94 | 1649 |
| Ex. 9 | 343 | 90 | 1573 |
| | 342 | 91 | 1579 |
| | 341 | 95 | 1607 |
| | 342 | 96 | 1617 |
| Ex. 10 | 353 | 90 | 1597 |
| | 358 | 96 | 1655 |
| | 354 | 95 | 1638 |
| | 352 | 95 | 1633 |
| Comp. Ex. 1 | 305 | 94 | 1515 |
| | 321 | 93 | 1545 |
| | 325 | 93 | 1554 |
| Comp. Ex. 2 | 317 | 94 | 1542 |
| | 315 | 89 | 1512 |
| | 316 | 82 | 1438 |

It is seen from Table 6 that, with the use of a negative electrode material according to the present invention, a lithium ion secondary battery superior in both the capacity and the efficiency can be produced.

What is claimed is:

1. A graphite powder formed by graphitization at a temperature ranging from about 1500° C. to less than 2200° C., the graphite powder comprising a carbon material containing about 0.01 to less than 1.0 wt % of boron and having a looped closure structure at an end of a graphite c-planar layer on at least a surface of cleavage formed by shearing, wherein the density of the interstitial planar sections between neighboring closure structures is not less than 100/μm and not more than 1500/μm, wherein the graphite powder further comprises a c-axis (002) planar section lattice distance (d002) that is 3.3650 Å or less as determined by a lattice constant measurement method by x-ray diffraction.

2. The graphite powder of claim 1, wherein the graphite powder further comprises a specific surface area that is 1.0 m²/g or less.

3. The graphite powder of claim 1, wherein the graphite powder has a crystallite diameter that ranges from 100 Å to 2000 Å.

4. The graphite powder of claim 1, wherein the graphite powder has a volume cumulative mean particle size that ranges from 5 μm to 35 μm as measured by a laser diffraction scattering method.

5. A negative electrode material of a lithium ion secondary battery, the negative electrode material consisting essentially of a graphite powder formed by graphitization at a temperature ranging from about 1500° C. to less than 2200° C., the graphite powder comprising a carbon material containing about 0.01 to less than 1.0 wt % of boron and having a looped closure structure at an end of a graphite c-planar layer on at least a surface of cleavage formed by shearing, wherein the density of the interstitial planar sections between neighboring closure structures is not less than 100/μm and not more than 1500/μm wherein the graphite powder further comprises a c-axis (002) planar section lattice distance (d002) that is 3.3650 Å or less as determined by a lattice constant measurement method by x-ray diffraction.

6. The negative electrode material of claim 5, wherein the graphite powder further comprises a specific surface area that is 1.0 $m^{2/}g$ or less.

7. The negative electrode material of claim 5, wherein the graphite powder has a crystallite diameter that ranges from 100 Å to 2000 Å.

8. The negative electrode material of claim 5, wherein the graphite powder has a volume cumulative mean particle size that ranges from 5 μm to 35 μm as measured by a laser diffraction scattering method.

9. A lithium ion secondary battery comprising:
a negative electrode material consisting essentially of a graphite powder formed by graphitization at a temperature ranging from about 1500° C. to less than 2200° C., the graphite powder comprising a carbon material containing about 0.01 to less than 1.0 wt % of boron and having a looped closure structure at an end of a graphite c-planar layer on at least a surface of cleavage formed by shearing, wherein the density of the interstitial planar sections between neighboring closure structures is not less than 100/μm and not more than 1500/μm;
a positive electrode material comprising $LiM^1_{1-x}M^2_xO_2$ or $LiM^1_2yM^2_yO_4$, where x and y are numerical figures such that 0<x<4 and 0<y<1 m $M^1$ and $M^2$ denote at least one of the transition metal of Co, Ni, Mn, Cr, Ti, V, Fe, Zn, Al, In and Sn and,
a nonaqueous electrolye,
wherein said negative electrode material and positive electrode material are coated on both sides of a current collector, wherein the graphite powder further comprises a c-axis (002) planar section lattice distance (d002) that is 3.3650 Å or less as determined by a lattice constant measurement method by x-ray diffraction.

10. The lithium ion secondary battery of claim 9, wherein the graphite powder further comprises a specific surface area that is 1.0 $m^{2/}g$ or less.

11. The lithium ion secondary battery of claim 9, wherein the graphite powder has a crystallite diameter that ranges from 100 Å to 2000 Å.

12. The lithium ion secondary battery of claim 9, wherein the graphite powder has a volume cumulative mean particle size that ranges from 5 μm to 35 μm as measured by a laser diffraction scattering method.

* * * * *